United States Patent
Behravan et al.

(10) Patent No.: US 9,832,778 B2
(45) Date of Patent: Nov. 28, 2017

(54) IN-DEVICE COEXISTENCE INTERFERENCE IN A COMMUNICATIONS NETWORK

(71) Applicant: Telefonaktiebolaget L M Ericsson (publ), Stockholm (SE)

(72) Inventors: Ali Behravan, Stockholm (SE); Muhammad Kazmi, Bromma (SE); Iana Siomina, Täby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 51 days.

(21) Appl. No.: 14/439,320

(22) PCT Filed: Nov. 5, 2013

(86) PCT No.: PCT/SE2013/051291
§ 371 (c)(1),
(2) Date: Apr. 29, 2015

(87) PCT Pub. No.: WO2014/070101
PCT Pub. Date: May 8, 2014

(65) Prior Publication Data
US 2015/0296526 A1    Oct. 15, 2015

Related U.S. Application Data

(60) Provisional application No. 61/722,362, filed on Nov. 5, 2012.

(51) Int. Cl.
*H04W 72/08* (2009.01)
*H04W 72/12* (2009.01)
(Continued)

(52) U.S. Cl.
CPC ........... *H04W 72/082* (2013.01); *H04L 43/16* (2013.01); *H04W 4/008* (2013.01); *H04W 16/14* (2013.01);
(Continued)

(58) Field of Classification Search
None
See application file for complete search history.

(56) References Cited

U.S. PATENT DOCUMENTS

2002/0080719 A1* 6/2002 Parkvall ............... H04L 1/0001
370/235
2011/0312288 A1* 12/2011 Fu .......................... H04B 1/406
455/88
(Continued)

FOREIGN PATENT DOCUMENTS

WO    WO 2012/108733    8/2012

OTHER PUBLICATIONS

International Search Report for International application No. PCT/SE2013/051291, dated Apr. 4, 2014.
(Continued)

Primary Examiner — Huy D Vu
Assistant Examiner — James P Duffy
(74) Attorney, Agent, or Firm — Baker Botts, LLP

(57) ABSTRACT

A method in a terminal device for In-Device Coexistence, IDC, interference handling is provided, the terminal device being configured to be in a communications network. The terminal device proactively detects an IDC interference between an in-device external wireless system and a cellular system, wherein said proactive detection occurs prior to a start of said IDC interference. Then, the terminal device sends, to a network node, an indication of IDC interference based on the proactively detecting. A terminal device, a network node and a method therein for IDC interference handling are also provided.

21 Claims, 7 Drawing Sheets

(51) Int. Cl.
    *H04W 16/14*     (2009.01)
    *H04L 12/26*     (2006.01)
    *H04W 4/00*     (2009.01)
    *H04W 24/02*     (2009.01)
    *H04W 76/04*     (2009.01)
    *H04W 88/06*     (2009.01)

(52) U.S. Cl.
    CPC ....... *H04W 24/02* (2013.01); *H04W 72/1215* (2013.01); *H04W 76/046* (2013.01); *H04W 88/06* (2013.01)

(56) References Cited

U.S. PATENT DOCUMENTS

| | | | |
|---|---|---|---|
| 2012/0069766 A1 | 3/2012 | Fu et al. | |
| 2012/0087341 A1* | 4/2012 | Jang | H04W 72/1215 370/331 |
| 2012/0182896 A1* | 7/2012 | Jang | H04W 24/10 370/252 |
| 2012/0213116 A1 | 8/2012 | Koo et al. | |
| 2012/0213162 A1* | 8/2012 | Koo | H04W 16/14 370/329 |
| 2013/0324172 A1* | 12/2013 | Ahn | H04W 36/0094 455/501 |

OTHER PUBLICATIONS

PCT Written Opinion of the International Searching Authority for International application No. PCT/SE2013/051291, dated Apr. 4, 2014.

3GPP TS 36.300 V11.2.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Jun. 2012.

3GPP TR 36.816 V11.2.0; 3rd Generation Partnership Project; Technical Specification Group Radio Access Network; Evolved Universal Terrestrial Radio Access (E-UTRA); Study on signalling and procedure for interference avoidance for in-device coexistence (Release 11), Dec. 2011.

3GPP TS 36.321 V11.0.0; 3rd Generation Partnership Project; Technical Specification Group Radio Access Network; Evolved Universal Terrestrial Radio Access (E-UTRA); Medium Access Control (MAC) protocol specification (Release 11), Sep. 2012.

* cited by examiner

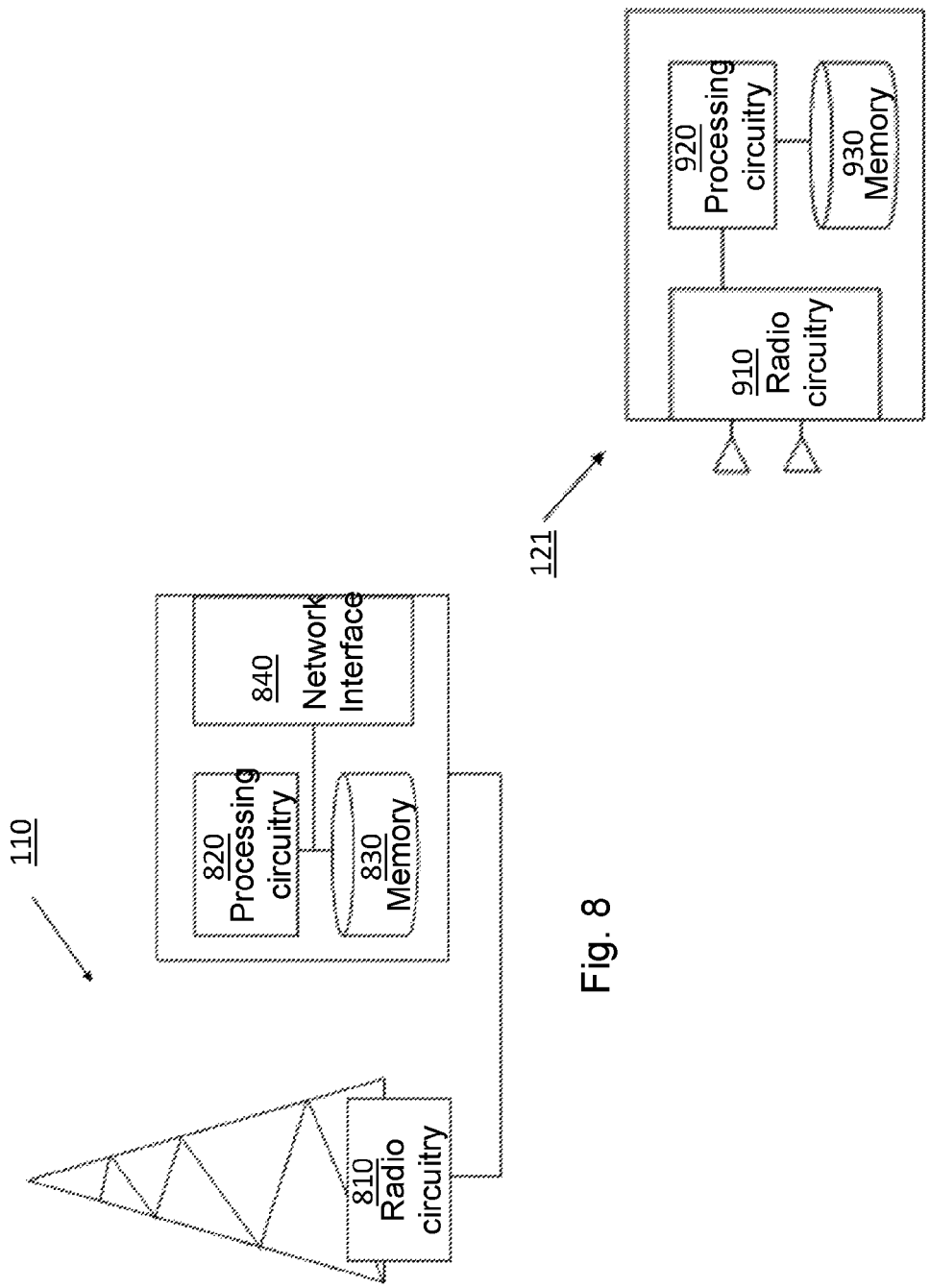

| UL-DL Configuration | DL-to-UL Switch-point periodicity | Subframe no | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

IN-DEVICE COEXISTENCE INTERFERENCE IN A COMMUNICATIONS NETWORK

PRIORITY

This nonprovisional application is a U.S. National Stage Filing under 35 U.S.C. §371 of International Patent Application Serial No. PCT/SE2013/051291, filed Nov. 5, 2013, and entitled "In-Device Coexistence Interference in a Communications Network" which claims priority to U.S. Provisional Patent Application No. 61/722,362 filed Nov. 5, 2012, both of which are hereby incorporated by reference in their entirety.

TECHNICAL FIELD

Embodiments herein relate to In-Device Coexistence, IDC, in a communications network. In particular, embodiments herein relate to a terminal device, a network node and methods therein for handling IDC interference in a communications network.

BACKGROUND

In a typical cellular network, also referred to as a communication network, User Equipments, UEs, communicate via a Radio Access Network, RAN, to one or more core networks, CNs. A UE is a mobile terminal or terminal device by which a subscriber may access services offered by an operator's core network, and/or services outside the operator's network but to which the operator's RAN and CN may provide access. The RAN covers a geographical area which is divided into cell areas, with each cell area being served by a network node or base station, e.g. a Radio Base Station (RBS), or in some RANs is also eNodeB (eNB), NodeB, B node. A cell is a geographical area where radio coverage is provided by the network node at a base station site. The network nodes communicate over the air interface operating on radio frequencies with the UEs that are within range of the network node, i.e. within the cell. A network node may serve one or more cells. The communication network, the network node and/or the UEs may be configured to implement one or more cellular radio technologies or Radio Access Technologies, RATs, such as, e.g. LTE, WCDMA, GSM or other 3GPP cellular network technology.

In today's UEs, multiple radio transceivers are commonly packaged inside the same device. A UE may be equipped with external wireless communication system, i.e. non-cellular communication systems. Some examples of such external wireless communication systems or RATs which may be located in a UE or cellular device are WiFi, Bluetooth transceivers, Global Navigation Satellite System, GNSS, receiver (e.g. GPS, Galileo, COMPASS, GANSS, etc.), sports or medical related short range wireless devices, cordless telephone, etc.

In these cases, the transmit power of one transmitter in a device may be much higher than the received power level of another receiver in the device, which due to the extreme proximity of these radio transceivers, may cause interference on the radio receiver.

FIG. 1 shows examples of frequency bands of different RATs according to prior art. In particular, FIG. 1 shows the 3GPP frequency bands that are located around 2.4 GHz ISM bands.

In FIG. 1, it may be seen that WiFi uses the frequency band 2400-2495 MHz in the ISM band. This band is divided into 14 channels, where each channel has a bandwidth of 22 MHz and 5 MHz separation from other channels with an exception of channel number 14 where the separation is 12 MHz.

It may also been seen that LTE may use the neighboring frequency band 2300-2400 MHz. also referred to as LTE band 40. Thus, a transmitter of LTE band 40 in a device will affect the WiFi receiver in the device, and vice-versa. LTE may also use the neighboring frequency band 2500-2570 MHz. also referred to as LTE band 7. Thus, a transmitter of LTE band 7 in a device will affect the WiFi receiver in the device. However, since LTE band 7 is a FDD band used for UL, there will be no impact from the WiFi transmitter in the device in LTE band 7.

Also, in FIG. 1, it may be seen that Bluetooth uses the frequency band 2402-2480 MHz in the ISM band. This comprises 79 channels of 1 MHz bandwidth each. Therefore, similar to WiFi, there will be interference between transmitters and receivers of LTE band 40 and Bluetooth in a device, as well as, interference from the transmitter of LTE band 7 UL to the Bluetooth receiver in the device.

Furthermore, the reception of GNSS in the ISM band, such as, e.g. the Indian Regional Navigation Satellite System that uses the frequency band 2483.5-2500 MHz, in a device may also be affected by a transmitter of LTE band 7 in the device.

These examples of interference scenarios may be summarized as:
- LTE Band 40 radio transmissions may cause interference to ISM radio receptions,
- ISM radio transmissions may cause interference to LTE Band 40 radio receptions,
- LTE Band 7 radio transmissions may cause interference to ISM radio receptions,
- LTE Band 7 radio transmissions may cause interference to GNSS radio receptions.

It should be noted that that the frequency bands and RATs discussed above are just examples of different possible frequency band scenarios. In general, the interference may be caused by any RAT and in any neighboring, or sub harmonic, frequency band. Thus, there is a need to avoid this In-Device Coexistence, IDC, interference between the LTE transceiver and the transceivers of other RATs in a device.

IDC interference avoidance may be performed autonomously by the UE or by a network node in the cellular communications network based on an indication from the UE, i.e. UE-assisted network controlled IDC interference avoidance.

According to one example, when IDC interference avoidance is performed autonomously by the UE, the UE may deny LTE subframes autonomously. This may be performed in order to avoid interfering with important signalling in other RATs.

During the denied LTE subframes, the UE does not transmit any cellular signal. The UE may also not receive any cellular signal. The amount of denials is limited using a maximum allowed denied LTE subframes over a denial validity period. Both the maximum number of denial LTE subframes and the denial validity period may be configured by the network node. Configuring a proper denial rate is left up to the implementation of the network node, but the UE may decide which subframes that are actually denied. The latter may be performed without any further feedback to the network node. Thus, this may also be referred to as "autonomous denials".

When the network node does not configure any denial rate for the UE, the UE does not perform any autonomous denials. The network node may be configured to configure this "autonomous denial" for the UE. This may be performed by the network node by sending a message to the UE comprising release or setup autonomous denial parameters, such as, e.g. autonomousDenialSubframes and autonomousDenialValidity. These parameters may be comprised in an information element in the message. One example of such an information element is the information element, IDC-Config, which is defined in LTE RRC specification, TS 36.331, Rel-11, version 11.1.0.

According to another example, when IDC interference avoidance is performed by a network node in the communications network, the UE may sends an IDC indication to the network node. This may be performed via dedicated RRC signalling and when the UE detects a level of IDC interference that cannot be solved by the UE itself. For example, the UE may send the IDC indication when the UE has problem in the reception of DL transmissions in the ISM band or in LTE band. However, the triggering of the sending of an IDC indication is up to the implementation in the UE, and the UE may rely on existing LTE measurements and/or UE internal coordination to do this.

FIG. 2 shows an example of signalling between a UE and a network node in a cellular communications network, e.g. EUTRAN, in view of IDC interference.

In Action 201, the UE and the network node may perform signalling related to the reconfiguration of the RRC connection.

In Action 202, upon detecting the IDC interference, the UE may send an IDC indication to the network node. This is performed in order to inform the network node of about the IDC inference or a change thereof that is experienced by the UE when in a RRC_CONNECTED state. It is also performed in order to provide the network node with information such that the network node is able to resolve the issue.

According to one example, the IDC indication may comprise the information element, InDeviceCoexIndication, which is defined in LTE RRC specification, TS 36.331, Rel-11, version 11.1.0. A part of the IDC indication may also be dedicated to interference direction. This part may indicate the direction of the IDC interference, i.e. which RAT is interfering with which RAT.

When the network node is notified of IDC interference through the IDC indication from the UE, the network node may perform IDC interference avoidance based on either Frequency Division Multiplexing, FDM, or Time Division Multiplexing, TDM.

When performing IDC interference avoidance based on FDM, the network node may move LTE signal away from the ISM band by performing inter-frequency handover within the cellular communications network, e.g. EUTRAN. The UE may inform the network node, e.g. via the IDC indication, when the LTE signal or other radio signals would benefit, or no longer benefit, from the LTE transceiver in the UE not using certain carriers or frequency resources. For example, by sending a list of E-UTRA carrier frequencies affected by the IDC interference, the UE may indicate which frequencies are unusable or preferably not used due to IDC interference.

When performing IDC interference avoidance based on TDM, the UE may signal any type of information that may be useful to the network node, such as, e.g. interferer type, mode, the appropriate offset in subframes, etc. The UE may also signal a suggested TDM pattern to the network node. Based on this information, the network node may configure a final TDM pattern, i.e. scheduling and unscheduled periods, for the UE.

This may be performed in order to ensure that the transmission time of a radio signal of the cellular communication network, such as, e.g. the LTE signal, does not coincide with reception time of another radio signal of an external wireless communication system, such as, e.g. a WiFi, Bluetooth or GNSS signal.

Furthermore, when performing IDC interference avoidance based on TDM, the network node may on either use Discontinuous Reception, DRX, or HARQ process reservation.

When performing IDC interference avoidance based on TDM using DRX, the LTE DRX mechanism is used to provide TDM patterns in order to resolve the IDC interference issues. As shown in FIG. 3, a TDM pattern may be specified by a total length commonly referred to as DRX periodicity and consists of an active or scheduling period, and an inactive or unscheduled period. The UE may provide the network node with a desired TDM pattern consisting of the periodicity of the TDM pattern and the scheduling period, or alternatively the unscheduled period. Then, it is up to the network node to decide and signal the TDM pattern that is to be used by the UE.

A DRX mechanism is defined in 3GPP TS 36.321, "Evolved Universal Terrestrial Radio Access (E-UTRA); Medium Access Protocol (MAC) protocol specification", Rel-11, version 11.0.0. The IDC indication may comprise information related to the DRX cycle length, DRX offset, and/or DRX active time. The DRX cycle length indicates the desired DRX cycle length that the network node is recommended to configure. The DRX offset indicates the desired DRX starting offset that the network node is recommended to configure. The DRX active time indicates the desired active time that the network node is recommended to configure.

When performing IDC interference avoidance based on TDM using HARQ process reservation, a number of LTE HARQ processes or subframes may be reserved for LTE operation, and the remaining subframes are used to accommodate transmission in the ISM or GNSS frequency band. In this way, IDC interference may be avoided, since the UE does not transmit LTE signals in the subframes during which the UE receive ISM or GNSS signals.

The network node sends a subframe reservation pattern to the UE in the form of a bitmap, which may be based on the information reported by the UE. The provided bitmap may comprise a list of one or more subframe patterns indicating which HARQ process that are requested and should be abstained from use. For example, the value 0 may indicate that the subframe is requested and should be abstained from use. According to another example, the bit sequence 1111110100 may indicate that subframes with number 7, 9 and 10 are requested and should be abstained from use. The size of bit string for FDD is 40, and for TDD is 70, 10, 60 for subframe configurations 0, 1-5, and 6, respectively. The reserved subframes should however comply with the LTE specification Rel 8/9 as regards UL and DL HARQ timing.

It should be noted that in order to assist the network, the necessary and or available information for both FDM and TDM may be sent by the UE in the IDC indication to the network node. The IDC indication may also be used by the UE to update the IDC information, such as, for example, when the UE no longer suffers from the IDC interference.

FIG. 4 shows different phases related to operations performed by the UE in view of IDC interference. At the beginning of phase 1, the UE detects a start of the IDC interference. During this phase, denoted by non-patterned area in FIG. 4, the UE has not sent an IDC indication to the network node yet. At the beginning of phase 2, the UE has successfully sent an IDC indication to the network node. During this phase, denoted by dotted area in FIG. 4, no configuration has been provided by the network node to the UE in order to solve the IDC interference issues. At the beginning of phase 3, the UE has been provided with a configuration by the network node in order to solve the IDC interference issues. During this phase, denoted by dashed area in FIG. 4, the configuration may be used by the UE in order to solve the IDC interference issues.

As may be seen from the above, IDC refers to the transmission and reception of signals to and from one RAT, such that it causes minimal or no interference to other RATs in the same UE. When a UE detects interference caused by IDC, the UE may indicate the IDC interference by sending specific signalling to the network node. Following the reception of the IDC indication, the network node may configure the UE with one or more configurations to avoid or mitigate the IDC interference, either autonomously or network assisted. During the phase of detecting the IDC interference, i.e. phase 1 in FIG. 4, the transmitted and/or received signal quality of the cellular LTE signal may become very poor or bad. This may result in that the UE may not even be able to send and/or receive information to or from the network node. Therefore, the UE may also not be able to configure or implement any measures for avoiding or mitigating the IDC interference.

In a worst case scenario, neither of the cellular communication network or the external wireless communication system may be able to operate until the IDC interference issue is resolved, i.e. disappears.

SUMMARY

It is an object of embodiments herein to improve IDC interference handling in a communication network.

According to a first aspect of embodiments herein, the object is achieved by a method in a terminal device for In-Device Coexistence, IDC, interference handling. The terminal device is configured to be in a communications network. The terminal device proactively detects an IDC interference between an in-device external wireless system and a cellular system, wherein said proactive detection occurs prior to a start of said IDC interference. Then, the terminal device sends, to a network node, an indication of IDC interference based on the proactively detecting.

According to a second aspect of embodiments herein, the object is achieved by a terminal device for IDC interference handling, the terminal device being configured to be in a communications network. The terminal device comprising processing circuitry configured to proactively detect an IDC interference between an in-device external wireless system and a cellular system, wherein said proactive detection occurs prior to a start of said IDC interference. Also, the terminal device comprises radio circuitry configured to send, to a network node, an indication of IDC interference based on the proactive detection.

According to a third aspect of embodiments herein, the object is achieved by a method in a network node for IDC interference handling. The network node is configured to be in a communications network. The network node receives, from a terminal device, an indication of an IDC interference between an in-device external wireless system and a cellular system. The indication further comprises information on whether a proactive and/or reactive mode of detection was utilized, wherein said proactive mode of operation occurs prior to a presence of the IDC interference and said reactive mode of operation occurs during a presence of said IDC interference.

According to a fourth aspect of embodiments herein, the object is achieved by a network node for IDC interference handling, the network node being configured to be in a communications network. The network node comprises radio circuitry configured to receive, from a terminal device, an indication of an IDC interference between an in-device external wireless system and a cellular system. The indication further comprises information on whether a proactive and/or reactive mode of detection was utilized, wherein said proactive mode of operation occurs prior to a presence of the IDC interference and said reactive mode of operation occurs during a presence of said IDC interference.

By being able to proactively detect an IDC interference between an in-device external wireless system and a cellular system, wherein said proactive detection occurs prior to a start of said IDC interference, and sends an indication thereof to the network node, it is ensured that the terminal device is able to at least successfully indicate the IDC interference to the network node and receive the IDC configuration from the network node. Thereby, the IDC interference handling in the communication network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIG. 8 is a block diagram depicting embodiments of a network node.

FIG. 9 is a block diagram depicting embodiments of a terminal device.

DETAILED DESCRIPTION

Figure 1:
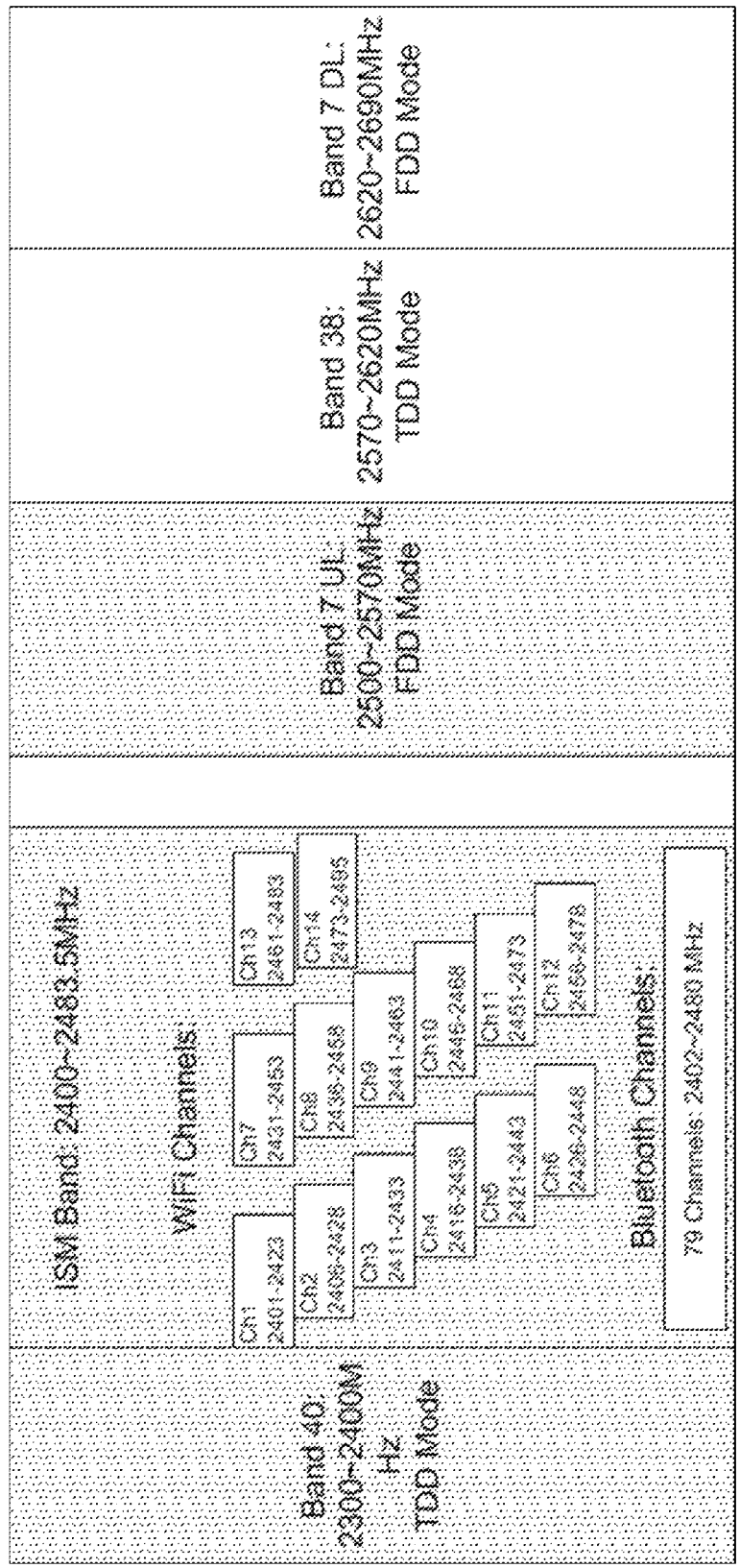
FIG. 1 is a schematic diagram illustrating examples of frequency bands of different RATs according to prior art.
Figure 2:
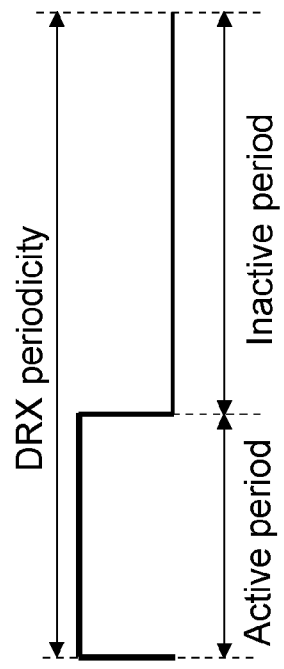
FIG. 2 is a signalling diagram illustrating signalling between a terminal device and a wireless communications network in view of IDC interference according to prior art.
Figure 3:
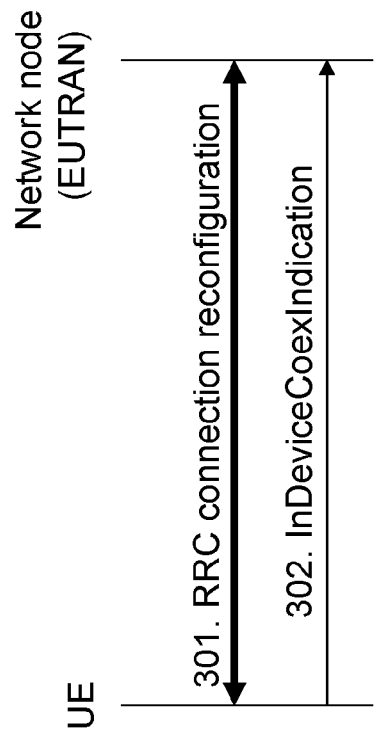
FIG. 3 is a schematic diagram illustrating DRX periodicity for TDM in view of IDC interference according to prior art.

The figures are schematic and simplified for clarity, and they merely show details which are essential to the understanding of the embodiments presented herein, while other details have been left out. Throughout, the same reference numerals are used for identical or corresponding parts or steps.

Figure 5:
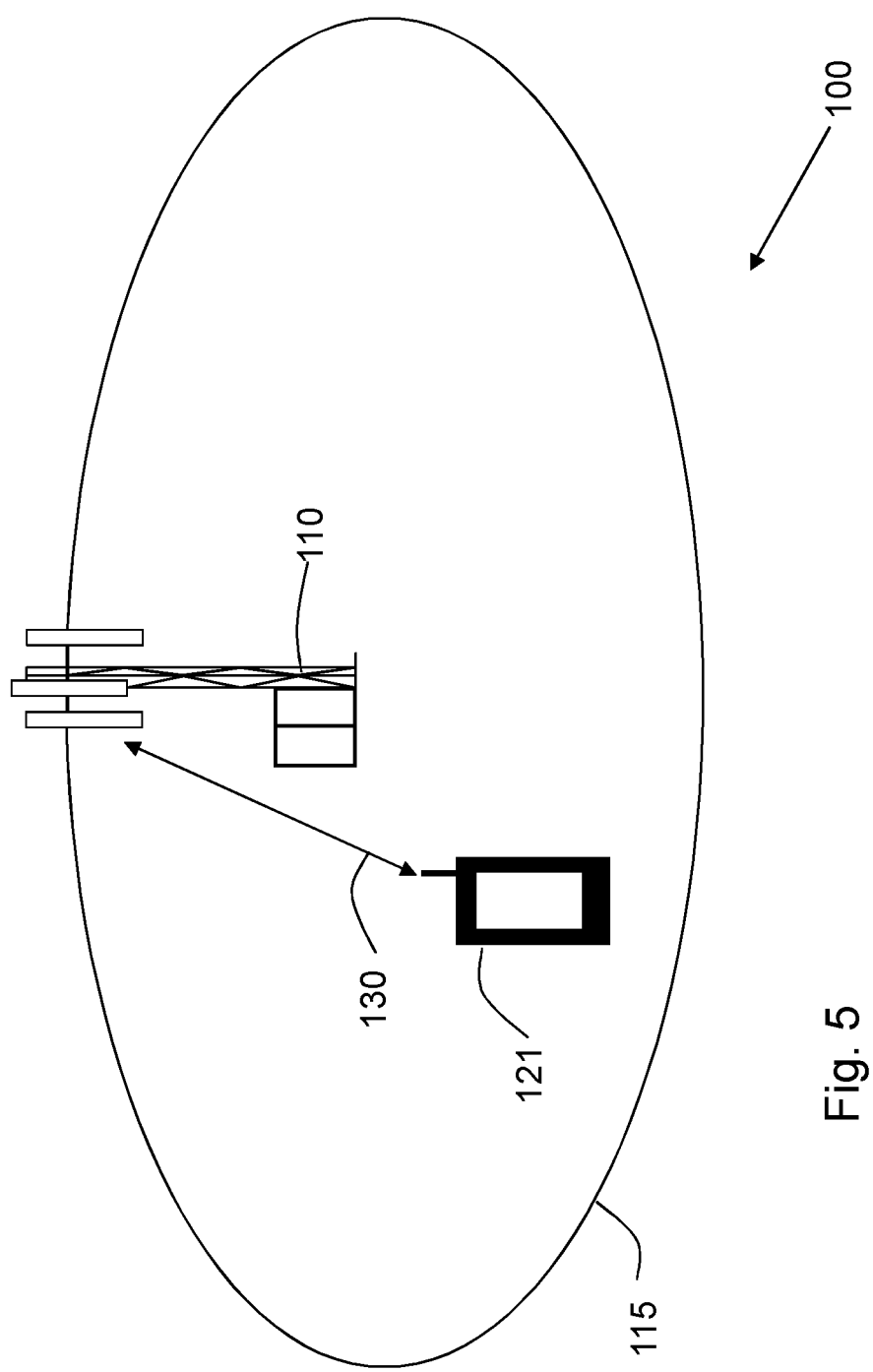
FIG. 5 is a schematic block diagram illustrating embodiments of a network node and a terminal device in a wireless communications network.

FIG. 5 depicts a communications network 100 in which embodiments herein may be implemented. The communications network 100 is a wireless communication network such as an LTE, WCDMA, GSM network, any 3GPP cellular network, or any cellular network or system. The communications network 100 may also, for example, be referred to as a cellular network or system, a radio communications network or a telecommunications network.

The communications network 100 comprises a base station, which is a network node and is therefore referred to herein as the network node 110. The network node 110 is a network unit capable to serve user equipments which is located in area, i.e. cell 115, served by the network node 110 in the communications system 100. The network node 110 may be comprised or configured to be in the communications network 100 and may also be configured to communicate with other network nodes of the communications network 100.

A user equipment (UE) 121, which also may be interchangeably referred to as a terminal or terminal device, is located within an area which is served by the network node 110. The user equipment 121 is configured to communicate within the communications system 100 via the network node 110 over a radio link 130 when the user equipment 121 is present in the area served by the network node 110. The user equipment 121 may thus be comprised in or configured to be in the communications network 100.

The network node 110 and the UE 121 are described in more detail below with reference to FIGS. 8-9.

As part of understanding and developing the embodiments described herein, some problems are first identified and discussed in more detail.

Conventionally, a UE is required to first detect the IDC interference. This is performed during phase 1 illustrated in FIG. 4. This detection of the IDC interference is typically performed by the UE over certain averaging period. The averaging period may be quite long, e.g. ranging between 100 ms to 1 second. At the end of phase 1 illustrated in FIG. 4, the UE sends an IDC indication based on the IDC interference detection to the network node informing the network node about the detected IDC interference issue.

Figure 4:
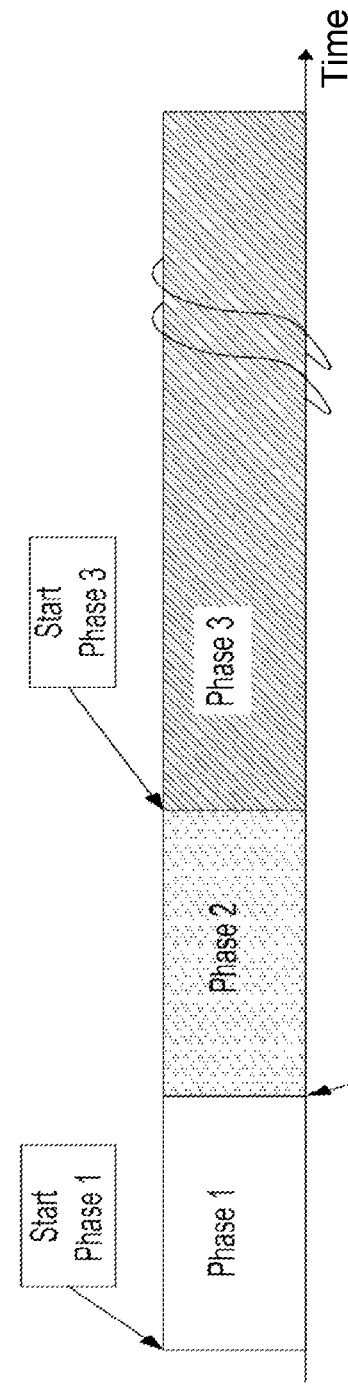
FIG. 4 is a schematic diagram illustrating different phases related to operations performed by terminal devices in view of IDC interference according to prior art.

During phase 2 illustrated in FIG. 4, the network node processes the received IDC indication from the UE. At the end of phase 2 illustrated in FIG. 4, the network node configures UE to perform IDC interference avoidance in order to alleviate the IDC interference issue or to at least minimize the impact of the IDC interference. This configuration is typically done via RRC signaling. The phase 2 illustrated in FIG. 4 may conventionally vary between 20-50 ms.

After receiving the IDC configuration, the UE will first process the received configuration from the network node before actually performing the IDC interference avoidance in order to solve the IDC interference issue. The processing of a RRC command in a UE may conventionally take about 15 ms.

From the above, it may be seen that the time period, $T_0$, between the start of the phase 1 illustrated in FIG. 4 and the moment that the configured IDC interference avoidance is actually performed, i.e. applied, by the UE may typically vary between 200 ms to over 1 second. During the time period, $T_0$, the operation of the cellular communication network and/or the external wireless communication systems coexisting in the UE will suffer. This may impact the conventional DL and/or UL operations between the UE and the cellular communication network.

It may be noticed that during this time the UE may also more easily detect if the interference is caused by in-device external wireless system or by other sources, such as, e.g. neighboring radio or network nodes, etc.

For example, the measurements and feedback transmissions made by the UE in the cellular communication network may deteriorate. Examples of such measurements and feedback transmissions may comprise, but is not limited to, RRM measurements, cell-ID measurements, signal measurements, radio link monitoring measurements, cell measurement sampling, HARQ signalling, CSI feedback, positioning signalling, D2D communication, etc. Some of these examples are described in more detail in the following.

Also, the reception and/or transmission of data in the cellular communication network may also degrade, which will increase retransmissions of data packets and thus degrade the service quality, e.g. resulting in higher BLER, etc.

In a worst case scenario, the transmission and/or reception signal quality in the cellular communication network may become so poor that the UE may not be able to successfully send the IDC indication to the network node and/or be able to successfully receive the IDC configuration from the network node. This may result in a complete disruption of the operation of the UE in the cellular communication network and/or the operation of the UE in the external wireless communication system(s).

In the following, according to embodiments herein which relate to In-Device Coexistence, IDC, interference handling in a communications network, there will be disclosed a network node 110, a terminal device 121, and methods therein which ensures the UE is able to at least successfully indicate the IDC interference to the network node and receive the IDC configuration from the network node.

Figure 6:
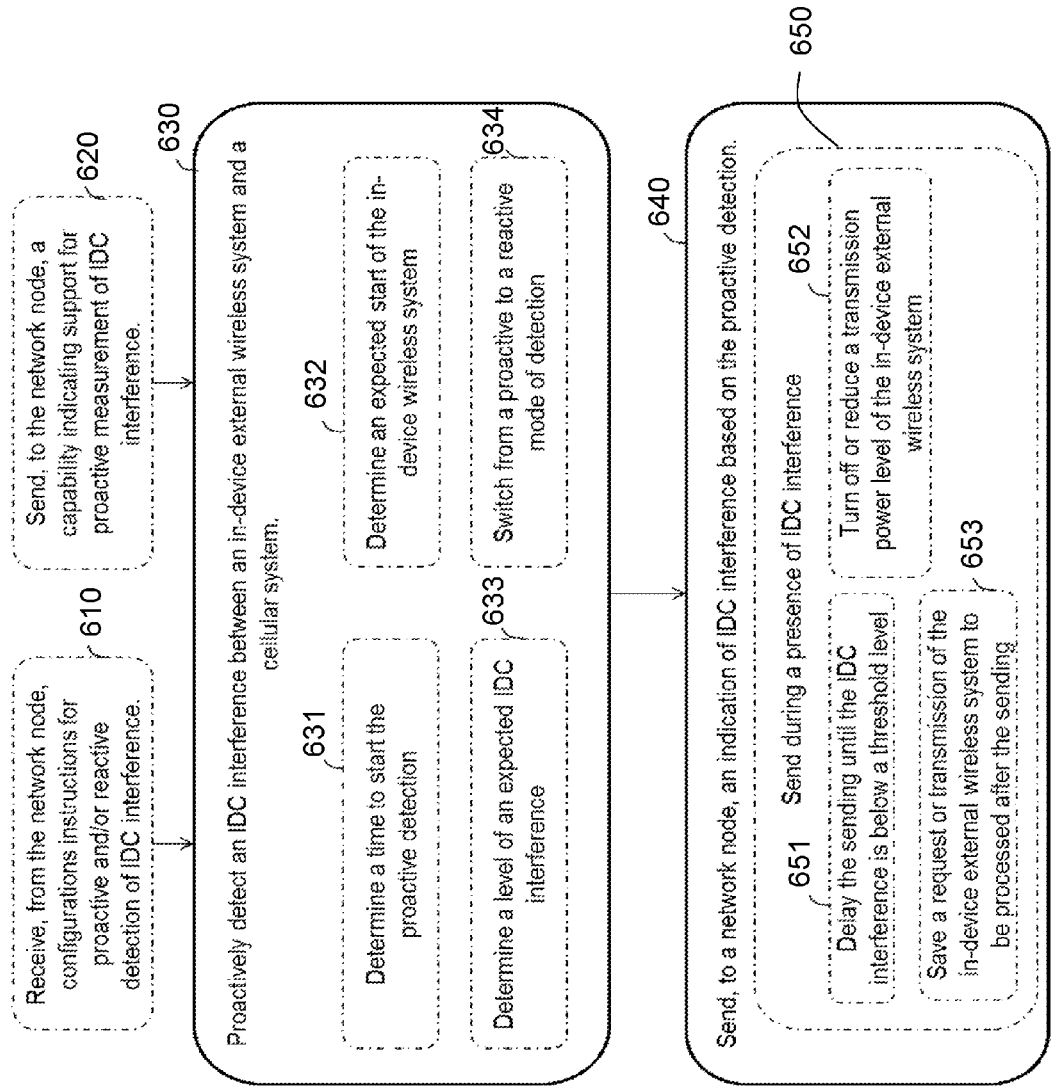
FIG. 6 is a flowchart depicting embodiments of a method in a network node.

Example of embodiments of a method in a terminal device or user equipment 121 for IDC interference handling will now be described with reference to the flowchart depicted in FIG. 6. FIG. 6 is an illustrated example of actions or operations which may be taken by a terminal device 121 configured to be in a communication network 100. The method may comprise the following actions.

Action 610. In this optional action, the terminal device 121 may receive, from the network node 110, configuration instructions for proactive and/or reactive detection of IDC interference. It should be noted that proactive detection of IDC interference may also be termed as implicit or predicted detection of IDC interference, and reactive detection of IDC interference may also be termed as explicit detection of IDC interference.

In some embodiments, there may be a determined or pre-defined rule of how early the IDC interference problem may be indicated by the terminal device 121 to the network node 110 prior to its expected occurrence. This is to avoid the assignment of resources by the network node 110 to the terminal device 121 for mitigating the IDC interference problem too much in advance. Some examples of such one or more determined or pre-defined rules that may form part of the configuration instructions are:

The terminal device 121 may be not allowed to send an early indication earlier than $\Delta T2$ prior to the expected event, i.e. start of in-device external wireless system, causing an IDC interference problem.

The terminal device 121 may be not allowed or not recommended to send an early indication related to the IDC interference problem later than $\Delta T3 < \Delta T2$ prior the expected event causing an IDC interference problem.

The terminal device 121 may not be allowed to proactively report the IDC problem under certain radio characteristics experienced at the cellular system and/or at the in-device external wireless system(s). For example, when the received signal quality at the terminal device 121 is below a threshold and/or transmitted power by the terminal device 121 is above a threshold.

The terminal device 121 may be allowed to proactively report the IDC problem when it is using certain type of critical services, such as, e.g. an emergency call.

Furthermore, the values ΔT1, ΔT2 and/or ΔT3 may also relate to the length of the phases 1, 2 and/or 3 as shown in FIG. 4.

As mentioned above, in existing conventional networks, the terminal device 121 reports the IDC problem (i.e. sends InDeviceCoexIndication message) to network node 110 when the IDC problem is actually experienced by the terminal device 121.

However, in embodiments herein, the network node 110 may also explicitly permit the terminal device 121 to report the IDC problem prior to its occurrence. The network node 110 may, for example, configure the terminal device 121 that until a certain time period, such as, e.g. starting from a reference time and during a time period until another point in time, the terminal device 121 may report the IDC problem before it occurs. In response, the terminal device 121 may attempt to predict the IDC problem according to the methods described below.

When the terminal device 121 detects the IDC problem, it sends the IDC problem indication to the network node 110. The terminal device 121 may also be configured to inform the network node 110 whether the IDC problem is indicated proactively (before the occurrence) or is indicated based on actual detection of the IDC interference. The network node 110 may configure the terminal device 121 such that it allows the terminal device 121 to send the IDC problem indication to the network proactively before they occur under one or more critical conditions. These conditions may be related to criticality level of the service, interference situation, radio performance, etc. Some specific examples of such critical conditions are:

when the received signal quality from the terminal device 121 is below a threshold, e.g. the SINR is below −3 dB.

when the reported measurement by the terminal device 121 is below a threshold e.g. RSRQ is below −12 dB.

when the terminal device 121 is using a critical service, e.g. a time delay sensitive service, an emergency call, etc.

Thus, the network node 110 comprises a method of configuring the terminal device 121 allowing proactive indication according to a determined or pre-defined rule.

Action 620.

In this optional action, the terminal device 121 may send, to the network node 110, a capability indicating support for one or more of: proactive detection of IDC interference between the in-device external wireless system and the cellular system, and switching between a proactive detection and a reactive detection of IDC interference between the in-device external wireless system and the cellular system. That is, capability indicating support for proactive measurement of IDC interference.

Advantageously, the terminal device 121 may thus indicate or provide relevant capability information to the network node 110 to inform the network node 110 of whether the terminal device 121 is capable of determining and reporting the IDC problem to the network node 110 based on implicit determination (i.e. without performing actual measurement of IDC interference) and reporting of the IDC problem to the network node 110 or not.

The capability information of the terminal device 121 may also indicate to the network node 110 whether the terminal device 121 is capable of selecting between the implicit determination and reporting of the IDC problem to the network and the explicit determination (i.e. by performing actual measurement of IDC interference) and reporting of the IDC problem to the network node 110 or not. It should further be appreciated that the capability may also comprise information regarding preconfigured settings of the terminal device 121 with respect to the proactive detection. This information may be e.g. threshold information, triggering information, etc.

In some embodiments, reported capability information of the terminal device 121 may comprise or contain any information or parameters described herein related to different methods of determining and reporting the IDC problem to the network node 110.

In some embodiments, the terminal device 121 may send the above mentioned capability information to the network node 110 in any of the following manner or ways:

a proactive reporting without receiving any explicit request from the network node 110, wherein the network node 110 may be e.g. a serving or any target network node, a reporting upon receiving any explicit request from the network node 110, wherein the network node 110 may be e.g. a serving or any target network node.

The explicit request may be sent to the terminal device 121 by the network node 110 anytime or at any specific occasion. For example, the request for the capability reporting may be sent to the terminal device 121 during initial setup or after a cell change, such as, e.g. handover, RRC connection re-establishment, RRC connection release with redirection, PCell change in CA, PCC change in PCC, etc.

In case of proactive reporting, the terminal device 121 may report its capability during one or more of the following occasions:

during initial setup or call setup, such as, e.g. when establishing the RRC connection, during cell change, such as, e.g. handover, primary carrier change in multi-carrier operation, PCell change in multi-carrier operation, RRC re-establishment, RRC connection release with redirection, etc.

The acquired capability information of the terminal device 121 may be used by the network node 110 for performing one or more radio operation tasks or actions. These one or more radio operation tasks or actions may comprise selection of a procedure, adapting a parameter in a configuration message related to measurement, scheduling, mobility, etc. One example of a radio operation task is the decision at the network node 110 whether to configure terminal device 121 to use explicit method, implicit method or any of the two methods for determining and reporting of the IDC problem to the network node 110. Another example is that when the terminal device 121 does not support an implicit method, then the network node 110 may configure the terminal device 121 to operate in a cellular band or frequency which is farthest from the bands or frequencies used by the in-device external wireless system(s).

Action 630.

In this action, the terminal device 121 proactively detects an IDC interference between an in-device external wireless system, such as, e.g. WiFi, Bluetooth, GNSS, etc., and a cellular system, such as, e.g. LTE, WCDMA, GSM, etc. This proactive detection occurs prior to a start of the IDC interference. This means that the terminal device 121 is enabled to send the indication to the network node 110 already before the IDC interference problem occurs. Herein, this may also be termed as implicit, proactive or predicted IDC problem indication.

This advantageously enables and ensures that radio reception and transmission can occur between the terminal device 121 and the radio network node, e.g. the network node 110, without any problem prior to receiving the IDC configuration from the network node 110.

In order to predict and inform IDC interference problem to the network, i.e. the network node 110, the cellular system, e.g. LTE, is assumed to be operating in one or more of the bands which interfere with the in-device external wireless systems, as described in the background portion above. For example, the prediction of IDC interference may be triggered in the terminal device 121 when the terminal device 121 operates using band 7 or band 40 as shown in FIG. 1. This may also be triggered in the terminal device 121 even if the cellular operation is not on-going or not fully active (e.g. in long DRX, or in idle state) but the terminal device 121 has been pre-configured to operate over cellular, i.e. over the cellular system, within a certain time while the external wireless system is active. Hence, in this case, the IDC problem needs to be predicted as well.

Examples of such pre-configuration scenarios are when the terminal device 121 is scheduled for UL transmission at pre-determined time, a requested measurement to be performed in the background in best-effort basis, a specific service requested, a high-rate or delay intolerant service is about to start, a high-QoS service has been requested, etc.

There are two basic scenarios of the operation of the in-device external wireless system, either the in-device external wireless system is operating or the in-device external wireless system is expected to operate. In both of these cases, as described below, the IDC capable terminal device 121 may take appropriate action and perform a prediction step to predict the IDC interference.

Firstly, in the optional Action 631, the terminal device 121 may according to some embodiments further determine a time to start the proactive detection. This allows the terminal device 121 to act early on when an interference start to hit the desired signal or even before the interference starts in the terminal device 121. As previously described, it usually takes time to go through all three phases in the prior art (i.e. detecting the start of the interference by the terminal device, indicating to the network node the start of the interference, and be provided with a solution from the network node), and during this time the interference is present which is degrading the reception of the desired signal. Thus, the above feature may reduce the interference considerably.

In this case, the terminal device 121 may also determine the time to start the proactive detection based on any one or more of: a time threshold, detected radio characteristics with respect to a signal threshold, or a type of application or service that is in use.

Here, the detected radio characteristics with respect to a signal threshold, which may be programmable, may e.g. be that the detection may start when a received signal quality at the terminal device 121 is below said signal threshold. Also, the time threshold, which may be programmable, may e.g. be a programmable time threshold that may be provided with respect to an expected event or start of an in-device external wireless system. If there is an on-going operation of one or more in-device external wireless system then terminal device 121 may turn of the operation of these in-device external wireless systems temporarily. This may e.g. be performed over T0 and optionally over T1, where T1 is a time period that starts after T0. During T0, the terminal device 121 may determine, or more specifically predict, the IDC interference as described in more detail below. During T1, the terminal device 121 may send IDC configuration requests and receive IDC configuration (e.g. assignment of scheme) from the network node 110.

These actions enable the terminal device 121 to operate the cellular systems (i.e. reception and transmission) without any problem, and thereby enable it to communicate with the network node 110.

Secondly, in the optional Action 632, the terminal device 121 may according to some embodiments, as part of the proactive detection, further determine an expected start of the in-device external wireless system. In this case, the terminal device 121 may determine the expected start of the in-device external wireless system based on any one or more of: an activity level of the in-device external wireless system, collected statistics or historical performance data of the terminal device, or a type of application program or service. Here, the activity level of the in-device external wireless system may e.g. be a number of active WLAN access points. If the in-device external wireless system is not currently operating but is expected to start based on a prediction, then the terminal device 121, i.e. the terminal device 121, may immediately attempt to predict the IDC interference as described below.

In order to predict that one or more in-device external wireless systems, which may interfere with the on-going cellular operation are expected to start the terminal device 121 may, as indicated above, use one or more of the following mechanisms:

According to one example, the prediction that an in-device external wireless system may start may be based on the activity level of external wireless systems, such as, e.g. a number of active WiFi (WLAN) access points.

According to another example, the prediction that an in-device external wireless system may start may be based on the collected statistics, such as, e.g. for other terminal devices in the area, or the historical performance data for this terminal device 121, such as, e.g. when the terminal device 121 appears in the same area or experiences the same conditions more than once and the conditions have been "recognized" by the terminal device 121 and/or the network node 121.

According to a further example, the prediction that an in-device external wireless system may start may be based on a type of application program or service the subscriber is using. For example, if the user of the terminal device 121 is using an application program that requires local file transfer between devices then the terminal device 121 may predict that the subscriber may initiate a Bluetooth system within a short period of time.

In the optional Action 633, the terminal device 121 may according to some embodiments, as part of the proactive detection, further determine a level of an expected IDC interference. In this case, the terminal device 121 may also determine the level of an expected IDC interference based on at least one or more of: a type of in-device external wireless system or cellular system to be used, a frequency band of operation of said in-device external wireless system or cellular system, an expected power transmission of said in-device external wireless system, measured or received signal quality metrics related to the cellular system, a transmit signal level or a signal characteristics related to the cellular system, or a target quality of service of an upcoming service or communication.

It follows that, after predicting the expected operation of the in-device external wireless system(s), the terminal device 121 may initiate the predicting of the IDC interference. As indicated above, the terminal device 121 may then take into account, for the in-device external wireless system(s), at least the type of the in-device external wireless system(s) which are expected to start, such as, e.g. WiFi (WLAN), Bluetooth, GNSS, etc., and the frequency band, or frequency range, of the in-device external wireless system(s) which are expected to start, such as, e.g. 2.400-2.495 GHz for WiFi. The terminal device 121 may then take into account, for the cellular system(s), at least the type of cellular technology or RAT, e.g. LTE, HSPA, etc., and the frequency band, or frequency range, of operation of the cellular system, such as, e.g. band 7 or band 40 as shown in FIG. 1.

If the technologies, i.e. RATs or types, and frequency bands of the expected in-device system(s) and cellular systems are such that the IDC interference will degrade the performance of one or both of these systems, then the terminal device 121 may proceed to estimating the IDC interference level.

According to one example, the prediction may be based on expected transmit power of the in-device external wireless system. For example, higher transmit power will cause more interference to the cellular systems. The prediction of transmit power may be based on one of more of: the expected data rate, the radio environment, the expected distance between the terminal device 121 and the Access Point (AP) serving the in-device external wireless system, etc. In case of using the radio environment, the radio environment may be, for example, the level of dispersion, the Doppler speed of the terminal device 121, etc. In case of using the expected distance, if e.g. the average and/or peak transmission power of the in-device external wireless system is expected to be above a threshold, such as, e.g. 0 dBm, then the terminal device 121 may assume that the IDC interference problem is severe in that the operation of the in-device external wireless system and/or the cellular system will be degraded.

According to another example, the prediction of IDC interference may be determined from one or more received signal quality metric or measurements related to the cellular system, such as, e.g. the signal quality at the terminal device 121 from the network node 110. Examples of the measure or metric related to signal quality are RSRP-, RSRQ-, SNR-, BLER-, SINR-, CSI-, RLF rate-, call dropping rate-measurements, etc. For example, if the cellular system signal quality received at the terminal device 121 is below a threshold, such as, e.g. the RSRQ being below −12 dB and/or the RSRP being below −105 dBm, then the terminal device 121 may assume that the IDC interference problem is severe in that the operation of the cellular system will be degraded.

According to a further example, the prediction of IDC interference may be determined from one or more transmit signal level or signal characteristics related to the cellular system, such as, e.g. the signal transmitted from the terminal device 121 towards the network node 110. Examples of the measure or metric related to transmitted signal level or signal characteristics are average and/or peak transmit power of the terminal device 121, power headroom of the terminal device 121 (i.e. the difference between maximum power and transmitted power in log scale), etc. For example, if the average transmitted power of the terminal device 121 towards the cellular system is above a threshold, such as, e.g. −3 dBm, then the terminal device 121 may assume that the IDC interference problem will become severe when the in-device external wireless system operates and thus will degrade the operation of the in-device external wireless system.

According to yet a further example, the target quality of the upcoming service or communication may also be taken into account when predicting the IDC interference problem. For example, the IDC interference problem may not be severe or less severe for delay-tolerant or low-rate services.

In the optional Action 634, the terminal device 121 may according to some embodiments, as part of the proactive detection, further switch from a proactive mode of detection to a reactive mode of detection, wherein said reactive mode of detection occurs when the IDC interference is already present.

This is advantageous since, under certain conditions, the proactive mode may not be the most favourable. For example, if the IDC interference is present and when the severity of the ongoing service in the in-device external wireless system is low, then the in-device external wireless system may not indicate any interference. This may occur when the terminal device 121 is in the reactive mode. In other words, by switching from a proactive mode of detection to a reactive mode of detection, the in-device external wireless system may decide whether the IDC interference should be stopped or not. This is described in more detail below.

In this case, the terminal device 121 may also switch from a proactive mode of detection to a reactive mode of detection based on at least one or more of a predetermined triggering condition or rules, a predicted or determined level of IDC interference, an availability of performance statistics or historical performance data of the terminal device, signal quality measurements, a criticality or severity (such as e.g. a critical priority level) of an on-going service, or a frequency separation between, or of, operating frequencies of the cellular system and the in-device external wireless system. Here, the predicted or determined level of IDC interference may e.g. be a present or expected IDC level. This autonomous selection in the terminal device 121 is described below, while a network based selection in the network node 110 is described with reference to FIG. 7 in the following.

In the autonomous selection in the terminal device 121 between explicit and implicit determination and reporting of the IDC problem to the network node 110, selection is performed autonomously by the terminal device 121. In this case, the terminal device 121 may select one of the methods based on one or more criterion, which criterion may be determined in the terminal device 121, e.g. pre-defined, decided by the terminal device 121 itself, or even configured by the network node 110. However, the decision about selecting a method may be performed by the terminal device 121 without receiving an instruction from the network node 110.

The selection by terminal device 121 between the explicit and implicit method may be based on one or more criteria or triggering conditions. These criteria or triggering conditions may be pre-defined, configured by the network node 110, or decided by the terminal device 121. Some examples of these criteria or triggering conditions are:

The selection may be based on the severity of the upcoming IDC problem, such as, e.g. the predicted impact on the LTE service quality or the amount of the predicted IDC interference. In some embodiments, when the problem is more severe, then the implicit method may be used.

The selection may be based on the availability of the performance statistics or historical performance data. For example, when the performance statistics or the historical performance data are available, then the implicit method may be selected (in case the statistics and data is sufficient or reliable, e.g. meet a certain confidence level).

In some embodiments, a trigger or criterion for the selection between the two methods may be a signal quality or level of the requested or ongoing LTE operations.

In some embodiments, the trigger or criterion for the selection may be any other measurement, such as, e.g. SNR, BLER, SINR, CSI, RLF rate, call dropping rate, etc. For example, when a measured RSRP or RSRQ on an LTE signal is below a threshold, and there is an important upcoming signaling on the non-LTE technology, i.e. the in-device external wireless system, then the terminal device 121 may select to use implicit method. This in order to have a IDC solution in place with lower delay.

In some embodiments, the trigger or criterion for selection between the two methods may also be based on criticality level of an on-going service, such as, e.g. using the implicit method when the criticality level is high.

In some embodiments, the trigger or criterion for selection between the two methods may also be based on the frequency separation between the frequencies of the cellular system and of the in-device external wireless system(s). For example, if their frequencies are separated by less than a margin, such as, e.g. 10 MHz, then the terminal device 121 may use the implicit method.

Action 640.

After proactively detecting an IDC interference, the terminal device 121 sends, to the network node 110, an indication of the IDC interference based on the proactively detecting.

In some embodiments, the indication of the IDC interference based on the proactively detection may further comprises an identification of a type of detection utilized, e.g. proactive or reactive. It should further be appreciated that the IDC indication may also comprise a detection history, e.g. in the case that an operational mode has switched from a proactive to reactive mode of operation.

It should also be noted that this IDC indication message may include a field to show whether implicit or explicit determination and indication method is used by the terminal device 121. In case of implicit measurement, the message may include further information regarding the predicted IDC, such as, e.g. the starting time of the IDC problem, the preferred time of applying the IDC, and the request for delaying or extending the measurement periods. The terminal device 121 may also indicate the triggering conditions or criteria which was used for selecting implicit or explicit method, such as, e.g. due to poor signal quality, etc.

In the optional Action 650, the terminal device 121 may according to some embodiments, send the indication of IDC interference during a presence of the IDC interference, i.e. the sending in Action 640 may occur during a presence of the IDC interference.

In the optional Action 651, the terminal device 121 may according to some embodiments, send the indication of IDC interference after a level of the IDC interference is below a threshold, i.e. the sending in Action 640 may be delayed until a level of the IDC interference is below a threshold. The threshold may be programmable. This means that the terminal device 121 may advantageously selectively delay the IDC indication under critical cellular operation.

According to this embodiment, in case of explicit measurement and reporting, after IDC interference was detected, the terminal device 121 may selectively delay indication of the IDC problem if some important or critical cellular system operation is ongoing. Such a specific cellular system operation may also be pre-defined, pre-configured, determined based on a priority, indicated by the network node 110 or the terminal device 121 may determine itself the importance or priority of the specific cellular system operation. In addition, the terminal device 121 may also delay the actual operation of the in-device external wireless system in order to protect the specific cellular system operation and start the in-device external wireless system after the specific cellular system operation is finished. Examples of such specific cellular system operations is an emergency call, an explicit request by subscriber that on-going service should not be interrupted until the call or session is completed (e.g. an on-going live match or program, etc.).

This may be particularly useful when some important UL cellular system transmission interferes with the reception of the in-device external wireless system. The prioritization between cellular system operation and the in-device external wireless system is up to implementation in the terminal device 121 or may be configured by the network node 110.

According to this embodiment, the delaying of the IDC problem indication may also be applied in case of implicit measurement, where the starting time of the IDC interference is predicted, but the indication to the network node 110 is delayed so that the cellular system operation may be finished. For example, when it is predicted that there will be IDC problem between the cellular system and the external wireless system, the indication may be delayed so that the cellular system operation may be finished.

The terminal device 121 may also inform the network node 110 that the IDC indication was delayed over a certain time period. The terminal device 121 may also inform the network node 110 of the reason for delaying the IDC indication. The terminal device 121 may also display such information on the screen of the terminal device 121 or prompt to the subscriber, i.e. user of the terminal device 121, that the in-device external wireless system will not be started: before the current application is terminated, up to certain time, or unless the subscriber explicit terminates the on-going service or removes, or withdraws, the instruction related to 'no interruption to current service'.

In the optional Action 652, the terminal device 121 may according to some embodiments, as part of sending the indication, turn off or reduce a transmission power level of the in-device external wireless system during the sending of the indication. This means that as an alternative to fully turning off more in-device external wireless system, the terminal device 121 may also significantly reduce its transmission power level. The amount of reduction in transmission power should be such that the in-device external wireless system can maintain a communication using a minimum rate channel e.g. with WLAN access point. These actions will also enable the terminal device 121 to operate the cellular systems (i.e. reception and transmission) without any problem and thereby enable it to communicate with the network node 110.

In the optional Action 653, the terminal device 121 may according to some embodiments, as part of sending the indication, save a request or transmission of the in-device external wireless system to be processed after the sending of the indication. This means that the terminal device 121 may not completely reject the in-device external wireless system operational request. Instead the terminal device 121 may store the request and start the in-device external wireless system(s) after it has received the IDC configuration, such as, e.g. the IDC autonomous denial configuration from the network, i.e. the network node 110.

Figure 7:
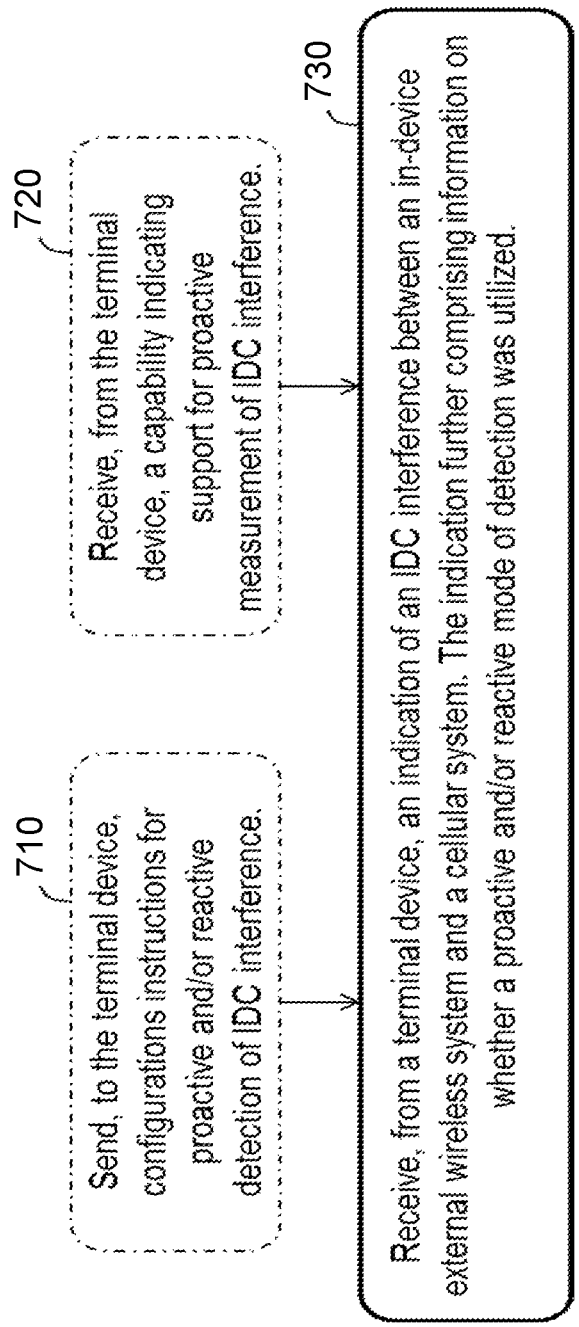
FIG. 7 is a flowchart depicting embodiments of a method in a terminal device.

Example of embodiments of a method in a network node 110 for IDC interference handling will now be described with reference to the flowchart depicted in FIG. 7. FIG. 7 is an illustrated example of actions or operations which may be taken by a network node 110 configured to be in a communication network 100. The method may comprise the following actions.

In the optional Action 710, the network node 110 may according to some embodiments, send to the terminal device 121 configuration instructions for a detection of said IDC interference. The detection may e.g. be proactive or reactive. This may also be termed implicit and explicit detection.

In some embodiments, the configuration instructions may further comprise switching instructions for switching to and from the proactive and reactive mode of detection, and/or instructions of using one or the other of the proactive and reactive mode of detection. The switching instructions may, for example, be based on one or more of: a tolerance for delay of an on-going service, a type of in-device external wireless system or cellular system to be used, a frequency band of operation of said in-device external wireless system or cellular system, a capability or subscription of the terminal device, and any threshold associated with any form or type of criteria. The threshold may be programmable.

In the optional Action 720, the network node 110 may according to some embodiments, receive from the terminal device 121 a capability indicating support for one or more of: proactive detection of IDC interference between the in-device external wireless system and the cellular system, and switching between a proactive detection and a reactive detection of IDC interference between the in-device external wireless system and the cellular system. That is, capability indicating support for proactive measurement of IDC interference. It should further be appreciated that the capability may also comprise information regarding preconfigured settings of the terminal device 121 with respect to the proactive detection, such as, e.g. threshold information, triggering information, etc.

The above enables a network based selection between explicit and implicit, i.e. proactive and reactive, detection and reporting of IDC interference in the terminal device 121. This selection and reporting of the IDC problem to the network node 110 may be based on an instruction from the network node 110, as indicated above. For example, an instruction or message may be sent to the terminal device 121 that, e.g. within a specified time interval, the terminal device 121 may use explicit or implicit detection and reporting of IDC interference. Alternatively, the instruction or message may indicate that any of the two IDC determination and reporting mechanisms may be used, i.e. to be decided by the terminal device 121. In this way, the terminal device 121 may be pre-configured, e.g. at the call setup or after cell change or when the terminal device 121 is operating over a certain frequency band, e.g. LTE band 40. The terminal device 121 may then use the explicit method, the implicit method or any of the two depending upon the network configuration.

The criterion used by the network node 110 for selecting between explicit and implicit, i.e. proactive and reactive, detection and reporting of IDC interference in the terminal device 121 may, for example, be when an on-going service has lower tolerance for delay, in which case the network node 110 may instruct terminal device 121 to do implicit (proactive) measurement to avoid any delay in the IDC solution. Another criterion may be, when the terminal device 121 is operating in a specific frequency band, such as, e.g. LTE band 7, the terminal device 121 may be allowed to use only the implicit method, but when using another frequency band, such as, e.g. the LTE band 40, the terminal device 121 may be allowed to use only the explicit method. A further criterion may be that, if the terminal device 121 supports certain types of in-device external wireless systems in certain frequency ranges, such as, e.g. WiFi (WLAN) in 2.4 GHz, then the terminal device 121 may be allowed to only use the implicit method. Yet a further criterion may be that, if the terminal device 121 has advanced receivers, then the terminal device 121 may be allowed to use any of the explicit or implicit methods, since it is expected that the terminal device 121 may be able to handle IDC problem more easily.

It should be noted however that the selection between the two methods for determining and reporting the IDC problem to the network node 110 may be performed by the network node 110 (as described above) and/or by the terminal device 121 as described above with reference to FIG. 6. Thus, in some embodiments, the terminal device 121 may select or switch between the explicit method (which is based on the real or actual measurement of IDC interference and the corresponding detection of IDC problem) and the implicit method (which is based on the prediction of the upcoming or expected IDC problem).

Action 730.

In this action, the network node 110 receives, from a terminal device 121, an indication of an IDC interference between an in-device external wireless system and a cellular system. The indication further comprises information on whether a proactive and/or reactive mode of detection was utilized, wherein the proactive mode of operation occurs prior to a presence of the IDC interference and the reactive mode of operation occurs during a presence of said IDC interference.

As described above, after the terminal device 121 detects start of IDC interference problem, the terminal device 121 may send an IDC indication to the network node 110. After network node 110 receives the indication, as indicated in this Action 730, the network node 110 may provide a solution or configuration, such as, e.g. the network node 110 may configure IDC denial subframes, etc., and send instructions to the terminal device 121 to solve the IDC problem. This is also referred to as explicit determination and reporting of the IDC problem.

To avoid the long delay between start of IDC interference and the application of the IDC solution, the terminal device 121 may use the implicit (aka proactive or predicted) determination and indication of the IDC problem to the network node 110.

To perform the method actions in the network node 110 for IDC interference handling, the network node 110 may comprise the following arrangement depicted in FIG. 8. FIG. 8 shows a schematic block diagram of embodiments of a network node 110. The network node 110 is configured to be in a communications network, such as, e.g. the communication network 100 shown in FIG. 5.

For example, the network node 110 may be a radio network node or in a general sense any node transmitting radio signals used for measurements, such as, e.g. an eNB, eNodeB, a Home Node B, a Home eNode B, femto Base Station (BS), macro/micro/pico BS, relay, beacon device, or repeater, etc. The network node 110 may also be a core network node, such as, e.g. a positioning node. The network node 110 may also be radio node which in general may be, e.g. a user equipment, a coordinating node, a positioning node, an associated eNodeB, etc. The embodiments described herein are not limited to LTE, but may apply with any RAN, single- or multi-RAT. A multi-RAT node may comprise a node with co-located RATs or supporting multi-standard radio (MSR) or a mixed radio node. Some other examples of applicable RATs are e.g. LTE-Advanced, UMTS, GSM, cdma2000, WiMAX, and WiFi.

A radio node, radio network node or network node may be used interchangeably in the description of the example embodiments herein. A radio node may comprise a radio node operating in one or more frequencies or frequency bands. It may be a radio node capable of carrier aggregation, CA.

The embodiments of the network node 110 described herein may be considered as independent embodiments or may be considered in any combination with each other to describe non-limiting examples of the example embodiments described herein.

As shown in FIG. 8, the example network node 110 may comprise processing circuitry 820, a memory 830, a radio circuitry 810, a network interface (IF) 440, and at least one antenna. The processing circuitry 820 may comprise RF circuitry and baseband processing circuitry (not shown). In particular embodiments, some or all of the functionality described above as being provided by a mobile base station, a base station controller, a relay node, a NodeB, or an enhanced NodeB, that is, a network node 110, may be provided by the processing circuitry 820 executing instructions stored on a computer-readable medium, such as the memory 830 shown in FIG. 8.

Alternative embodiments of the network node 110 may comprise additional components responsible for providing additional functionality, comprising any of the functionality identified above and/or any functionality necessary to support the example embodiments described herein.

It should also be appreciated that the processing circuitry (or any other hardware and/or software unit configured to execute operations and/or commands) of the network node 110 illustrated in FIG. 8 may be configured to configure and provide IDC interference handling as described herein.

This means that embodiments for IDC interference handling may be implemented through one or more processors, such as the processing circuitry 820 in the network node 110 depicted in FIG. 8, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 820 in the network node 110. The computer program code may e.g. be provided as pure program code in the network node 110 or on a server and downloaded to the network node 110.

Those skilled in the art will also appreciate that the processing circuitry 820 and the memory 830 described above may refer to a combination of analog and digital circuits, and/or one or more processors configured with software and/or firmware, e.g. stored in a memory, that when executed by the one or more processors such as the processing circuitry 820 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The radio circuitry 820 is configured to, or comprises a receiving module to, receive, from a terminal device 121, an indication of an IDC interference between an in-device external wireless system and a cellular system. The indication further comprises information on whether a proactive and/or reactive mode of detection was utilized. The proactive mode of operation occurs prior to a presence of the IDC interference, whereas the reactive mode of operation occurs during a presence of said IDC interference.

In some embodiments, the radio circuitry 820 may be configured to, or may comprise a sending module to, send, to the terminal device 121, configuration instructions for a detection of said IDC interference.

In some embodiments, the configuration instructions may further comprise switching instructions for switching to and from the proactive and reactive mode of detection. In this case, the switching instructions may be based on one or more of a tolerance for delay of an on-going service, a type of in-device external wireless system or cellular system to be used, a frequency band of operation of said in-device external wireless system or cellular system, a capability or subscription of the terminal device, and any threshold associated with any form or type of criteria. The threshold may be programmable.

In some embodiments, the radio circuitry 820 may be configured to, or may comprise a receiving module to, receive, from the terminal device 121, a capability indicating support for one or more of: proactive detection of IDC interference between the in-device external wireless system and the cellular system, and switching between a proactive detection and a reactive detection of IDC interference between the in-device external wireless system and the cellular system.

The example embodiments presented herein may be utilized in a communications network, e.g. the communications network 100 in FIG. 5, which may further comprise a network node 110 as illustrated in FIG. 8. The communications network may also comprise a terminal device 121, as illustrated in FIG. 9. It should be appreciated that the examples provided in FIGS. 8-9 are shown merely as non-limiting examples.

To perform the method actions in the terminal device 121 for IDC interference handling, the terminal device 121 may comprise the following arrangement depicted in FIG. 9. FIG. 9 shows a schematic block diagram of embodiments of a terminal device 121. The terminal device 121 is configured to be in a communications network, such as, e.g. the communication network 100 shown in FIG. 5.

It should be appreciated that the term 'terminal device', 'user equipment', 'UE', and 'mobile terminal' are herein used interchangeably. It may also be pointed out that these terms as used herein should be understood by the skilled in the art as non-limiting terms comprising any wireless device or node equipped with a radio interface allowing for at least one of: transmitting signals in UL and receiving data and/or measuring signals in DL.

For example, the terminal device 121 may, for example, be a mobile terminal or a wireless terminal, a mobile, a mobile phone, a sensor, a computer such as for example a laptop, a Personal Digital Assistant (PDA) or a tablet computer with wireless capability, a wireless terminal used for Machine Type Communication (MTC), a Machine-to-Machine (M2M) communication device, a wireless device used for Device-to-Device (D2D) communication, a fixed or mobile relay or relay node, a device equipped with a wireless interface, such as a printer or a file storage device, or any other radio network unit capable of communicating over a radio link in a communications system 100.

However, it should be noted that a "device" as the term is used herein, is to be broadly interpreted to further comprise a radio telephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radio telephone with data processing; a personal digital assistant (PDA) that can include a radio telephone or wireless communication system; a laptop; a camera (e.g., video and/or still image camera) having communication ability; and any other computation or communication device capable of transceiving, such as a personal computer, a home entertainment system, a television, vehicle etc.

Some radio nodes may also be equipped with a UE-like interface, such as, e.g. femto BS, home eNodeBs, relays, mobile relays, or small base stations. In these cases, these radio nodes may also be encompassed by the term 'terminal device' or 'user equipment'. The terminal device 121 may be capable of operating or performing measurements in one or more frequencies, carrier frequencies, component carriers or frequency bands. The terminal device 121 may also be capable of operating in single- or multi-RAT or multi-standard mode, such as, e.g. an example dual-mode UE may operate with any one or combination of WFi and LTE or HSPA and LTE.

The embodiments of the terminal device 110 described herein may be considered as independent embodiments or may be considered in any combination with each other to describe non-limiting examples of the example embodiments described herein.

The terminal device 121 may comprise processing circuitry 920, a memory 930, radio circuitry 910, and at least one antenna. The radio circuitry 910 may comprise RF circuitry and baseband processing circuitry (not shown). In particular embodiments, some or all of the functionality described above as being provided by mobile communication devices or other forms of wireless device may be provided by the processing circuitry 920 executing instructions stored on a computer-readable medium, such as the memory 930 shown in FIG. 9.

Alternative embodiments of the terminal device 121 may comprise additional components responsible for providing additional functionality, comprising any of the functionality identified above and/or any functionality necessary to support the example embodiments described herein.

It should be appreciated that the processing circuitry 920 (or any other hardware and/or software unit configured to execute operations and/or commands) of the terminal device 121 may be configured to provide IDC interference handling as described herein.

This means that embodiments for IDC interference handling may be implemented through one or more processors, such as the processing circuitry 920 in the terminal device 121 depicted in FIG. 9, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 920 in the terminal device 121. The computer program code may e.g. be provided as pure program code in the terminal device 121 or on a server and downloaded to the terminal device 121.

Those skilled in the art will also appreciate that the processing circuitry 920 and the memory 930 described above may refer to a combination of analog and digital circuits, and/or one or more processors configured with software and/or firmware, e.g. stored in a memory, that when executed by the one or more processors such as the processing circuitry 920 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The processing circuitry 920 is configured to, or may comprise a detecting module to, proactively detect an IDC interference between an in-device external wireless system and a cellular system, wherein said proactive detection occurs prior to a start of said IDC interference. Also, the radio circuitry 910 is configured to, or may comprise a sending module to, send, to a network node 110, an indication of IDC interference based on the proactive detection.

Prior to the sending, the radio circuitry 910 may be further configured to, or may further comprise a sending module to, send, to the network node 110, a capability indicating support for one or more of: proactive detection of IDC interference between the in-device external wireless system and the cellular system, and switching between a proactive detection and a reactive detection of IDC interference between the in-device external wireless system and the cellular system. Alternatively, the radio circuitry 910 may be further configured to, or may comprise a receiving module to, receive, from the network node 100, configuration instructions for proactive and/or reactive detection of IDC interference.

In some embodiments, the processing circuitry 920 is further configured to, or may comprise a determining module to, determine a time to start said proactive detection. In this case, the processing circuitry 920 may according to some embodiments be further configured to, or may comprise a determining module to, determine the time to start the proactive detection based on any one or more of a time threshold, detected radio characteristics with respect to a signal threshold, or a type of application or service that is in use. The above thresholds may be programmable.

In some embodiments, the processing circuitry 920 is further configured to, or may comprise a determining module to, determine an expected start of the in-device external wireless system. In this case, the processing circuitry 920 may according to some embodiments be further configured to, or may comprise a determining module to, determine the expected start of the in-device external wireless system based on any one or more of an activity level of the external wireless system, collected statistics or historical performance data of the terminal device, or a type of application program or service.

In some embodiments, the processing circuitry 920 is further configured to, or may comprise a determining module to, determine a level of an expected IDC interference. In this case, the processing circuitry 920 may according to some embodiments be further configured to, or may comprise a determining module to, determine the level of the expected IDC interference based on at least one or more of a type of in-device external wireless system or cellular system to be used, a frequency band of operation of said in-device external wireless system or cellular system, an expected power transmission of said in-device external wireless system, measured or received signal quality metrics related to the cellular system, a transmit signal level or a signal characteristics related to the cellular system, or a target quality of service of an upcoming service or communication.

In some embodiments, the processing circuitry 920 is further configured to, or may comprise a switching module to, switch from a proactive mode of detection to a reactive mode of detection, wherein said reactive mode of detection occurs when the IDC interference is already present. In this case, the processing circuitry 920 may according to some embodiments be further configured to, or may comprise a switching module to, switch from the proactive mode of detection to the reactive mode of detection based on at least one or more of a predetermined triggering condition or rules, a predicted or determined level of IDC interference, an availability of performance statistics or historical performance data of the terminal device, signal quality measurements, a criticality or severity (such as e.g. a critical priority level) of an on-going service, or a frequency separation between, or of, operating frequencies of the cellular system and the in-device external wireless system. In some embodiments, the radio circuitry 910 is further configured to, or may comprise a sending module to, send the indication during a presence of the IDC interference. In this case, the radio circuitry 910 may according to some embodiments be further configured to, or may comprise a delay module to, delay the sending of the indication until a level of the IDC interference is below a threshold. The threshold may be programmable. The radio circuitry 910 may also be further configured to, or may comprise a transmission power level module to, turn off or reduce a transmission power level of the in-device external wireless system during the sending of the indication. Further, the radio circuitry 910 may be configured to, or may comprise a saving module to, save a request or transmission of the in-device external wireless system to be processed after the sending of the indication.

As mentioned above, the measurements and feedback transmissions made by the terminal device 121 in the cellular communication network may deteriorate. Examples of such measurements and feedback transmissions are described in more detail below.

RRM Measurement

Several radio related measurements may be used by the terminal device 121 or the network node 110 to establish and keep the connection, as well as ensuring the quality of a radio link. The measurements are used in RRC idle state operations, such as, cell selection, cell reselection (e.g. between E-UTRANs, between different RATs, and to non-3GPP RATs), and minimization of drive test (MDT). The measurements are also used in RRC connected state operations, such as, for cell change (e.g. handover between E-UTRANs, handover between different RATs, and handover to non-3GPP RATs).

Cell ID Measurements

The terminal device 121 has to first detect a cell and therefore cell identification, e.g. acquisition of a physical cell identity (PCI), is also a signal measurement. The terminal device 121 may also have to acquire the cell global ID (CGI) of the terminal device 121. In HSPA and LTE, the serving cell may request the terminal device 121 to acquire the System Information (SI) of the target cell. More specifically, the SI is read by the terminal device 121 to acquire the cell global identifier (CGI), which uniquely identifies a cell, of the target cell. The terminal device 121 may also be requested to acquire other information, such as, a CSG indicator, CSG proximity detection, etc., from the target cell. The terminal device 121 reads the SI of the target cell (e.g. intra-, inter-frequency or inter-RAT cell) upon receiving an explicit request from the serving network node via RRC signalling, e.g. from RNC in HSPA or eNode B in case of LTE. The acquired SI is then reported to the serving cell. The signalling messages involved are defined in the relevant HSPA and LTE specifications.

In order to acquire the SI, which contains the CGI of the target cell, the terminal device 121 reads at least part of the SI including Master Information Block (MIB) and the relevant System Information Block (SIB). The terms SI reading/decoding/acquisition, CGI/ECGI reading/decoding/acquisition, CSG SI reading/decoding/acquisition are interchangeably used but have the same or similar meaning. In order to read the SI to obtain the CGI of a cell, the terminal device 121 is allowed to create autonomous gaps during DL and also in UL. The autonomous gaps are created, for example, at instances when the terminal device 121 has to read MIB and relevant SIBs of the cell, which depends upon the RAT. The MIB and SIBs are repeated with certain periodicity. Each autonomous gap is typically 3-5 ms in LTE and terminal device 121 needs several of them to acquire the CGI.

Signal Measurements

The RSRP and RSRQ are the two existing measurements used for at least RRM such as for mobility, which comprise mobility in RRC connected state, as well as, in RRC idle state. The RSRP and RSRQ are also used for other purposes such as for enhanced cell ID positioning, minimization of drive test etc.

The RSRP measurement provides cell-specific signal strength metric at a terminal device 121. This measurement is used mainly to rank different LTE candidate cells according to their signal strength and is used as an input for handover and cell reselection decisions. Cell specific reference signals (CRS) are used for RSRP measurement. These reference symbols are inserted in the first and third last OFDM symbol of each slot, and with a frequency spacing of 6 subcarriers. Thus, within a resource block of 12 subcarriers and 0.5 ms slot, there are 4 reference symbols.

The RSRQ is a quality measure which is the ratio of the RSRP and carrier RSSI. The latter part includes interference from all sources, such as, e.g. co-channel interference, adjacent carriers, out of band emissions, noise, etc.

The terminal device 121 depending upon its capability may also perform inter-RAT measurements for measuring on other systems, such as, e.g. HSPA, GSM/GERAN, CDMA2000 (1×RTT and HRPD), etc. Examples of inter-RAT radio measurements which can be performed by the terminal device 121 are CPICH RSCP and CPICH Ec/No for inter-RAT UTRAN, GERAN carrier RSSI for inter-RAT GSM and even pilot strength measurements for CDMA2000 1×RTT/HRPD.

In RRC connected state, the terminal device 121 may perform intra-frequency measurements without measurement gaps. However, as a general rule, the terminal device 121 performs inter-frequency and inter-RAT measurements in measurement gaps unless it is capable of performing them without gaps. To enable inter-frequency and inter-RAT measurements for the terminal device 121 requiring gaps, the network node 110 may have to configure the measurement gaps. Two periodic measurement gap patterns both with a measurement gap length of 6 ms are defined for LTE:

Measurement gap pattern #0 with repetition period 40 ms
Measurement gap pattern #1 with repetition period 80 ms The measurements performed by the terminal device 121 may then be reported to the network node 110, which may use them for various tasks.

The network node 110 may also perform signal measurements. Examples of network node measurements in LTE are propagation delay between the terminal device 121 and itself, UL SINR, UL SNR, UL signal strength, Received Interference Power (RIP) etc. The network node 110 may also perform positioning measurements which are described in a later section.

Radio Link Monitoring Measurements

The terminal device 121 may also perform measurements on the serving cell (aka primary cell) in order to monitor the serving cell performance. This is called as radio link monitoring (RLM) or RLM related measurements in LTE. For RLM, the terminal device 121 monitors the downlink link quality based on the cell-specific reference signal in order to detect the downlink radio link quality of the serving or PCell.

In order to detect out of sync and in sync, the terminal device 121 may compare the estimated quality with the thresholds Qout and Qin, respectively. The threshold Qout and Qin are defined as the level at which the downlink radio link cannot be reliably received and corresponds to 10% and 2% block error rate of a hypothetical PDCCH transmissions respectively.

In non-DRX downlink, the link quality for out of sync and in sync are estimated over an evaluation periods of 200 ms and 100 ms respectively. In DRX downlink, link quality for out of sync and in sync are estimated over the same evaluation period, which scale with the DRX cycle e.g. period equal to 20 DRX cycles for DRX cycle greater than 10 ms and up to 40 ms.

In non-DRX, the out of sync and in sync statuses are assessed by the terminal device 121 in every radio frame. In DRX, the out of sync and in sync statuses are assessed by the terminal device 121 once every DRX.

In addition to filtering on physical layer (i.e. evaluation period), the terminal device 121 may also apply higher layer filtering based on network configured parameters. This increases the reliability of radio link failure detection and thus avoids unnecessary radio link failure and consequently RRC re-establishment. The higher layer filtering for radio link failure and recovery detection would in general comprise the following network controlled parameters:

Hysteresis counters e.g. N310 and N311 out of sync and in sync counters respectively.
Timers e.g. T310 RLF timer For example, the terminal device 121 may start the timer T310 after N310 consecutive OOS detections. The terminal device 121 may stop the timer T310 after N311 consecutive IS detections. The transmitter power of the terminal device 121 may be turned off within 40 ms after the expiry of T310 timer. Upon expiry of T310 timer, the terminal device 121 may start T311 timer. Upon T311 expiry, the terminal device 121 may initiate RRC re-establishment phase during which it reselects a new strongest cell.

In HSPA, a similar concept called out of sync and in sync detection may be carried out by the terminal device 121. The higher layer filtering parameters (i.e. hysteresis counters and timers) are also used in HSPA. There is also RLF and eventually RRC re-establishment procedures specified in HSPA.

Sampling of Cell Measurement

The overall serving cell or neighbour cell measurement quantity results comprises of non-coherent averaging of 2 or more basic non-coherent averaged samples. The exact sampling depends upon the implementation and is generally not specified. An example of RSRP measurement averaging in E-UTRAN is shown in FIG. 10.

Figures 10, 11:
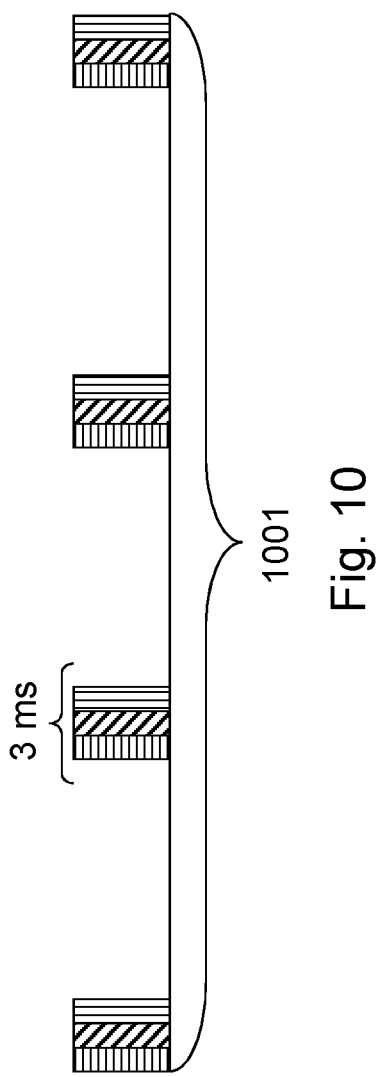
FIG. 10 is a schematic diagram illustrating RSRP measurement averaging in a wireless communications system.
FIG. 11 is a schematic diagram illustrating TDD UL and DL configurations in a wireless communications system.

FIG. 10 illustrates that the terminal device 121 may obtain the overall measurement quantity result by collecting four non-coherent averaged samples or snapshots, each being of 3 ms length in this example, during the physical layer measurement period 1001, i.e. 200 ms, when no DRX is used or when DRX cycle is not larger than 40 ms.

Every coherent averaged sample is 1 ms long. The measurement accuracy of the neighbour cell measurement quantity, e.g. RSRP or RSRQ, is specified over this physical layer measurement period. It should be noted that the sampling rate is specific to the implementation in the terminal device 121. Therefore, in another implementation in the terminal device 121, the terminal device 121 may use only 3 snap shots over 200 ms interval.

Regardless of the sampling rate, the measured quantity fulfils the performance requirements in terms of the specified measurement accuracy. In case of RSRQ, both RSRP (numerator) and carrier RSSI (denominator) should be sampled at the same time to follow similar fading profile on both components.

The sampling also depends upon the length of the DRX cycle. For example for DRX cycle >40 ms, the terminal device 121 typically takes one sample every DRX cycle over the measurement period. A similar measurement sampling mechanism is used for other signal measurements by the terminal device 121 and also by the BS for UL measurements.

Hybrid Automatic Repeat Request (HARQ) in LTE

HARQ is a process of acknowledging the transmission in DL or UL. If the received data is error-free, an acknowledgement is sent to the transmitter declaring a positive acknowledgement, ACK. If on the other hand, error detected in the transmission, a negative acknowledgement, NACK, is sent to the transmitter, which means that the packet must be re-transmitted. In LTE, certain timing is agreed between the transmitter and receiver for retransmissions.

In FDD mode, HARQ processes have 8 ms (i.e. 8 subframes) Round Trip Time, RTT, in both UL and DL. This means that 4 ms after transmission an ACK or NACK feedback is expected from the receiver, and if a retransmission is required 4 ms after the feedback, the packet is retransmitted.

In TDD mode, since the DL and UL subframes can be different in different UL/DL configurations, the HARQ timing is different. As an example, in UL/DL configuration 1, as shown by the table in FIG. 11, the ACK/NACK feedback to a downlink transmission can only be sent on subframes number 2, 3, 7, and 8. Therefore, the 8 ms round trip time that was mentioned for FDD, is not valid for this case.

CSI Feedback

In order to utilize the variations in channel in the channel dependent scheduling, an LTE terminal device must provide the network node 110 with the channel state report. The report is based on known reference symbols that are transmitted in the DL. Channel state report consists of one or several of the following information:

Rank indication (RI): RI is a recommendation to the network node 110, on how many layers in the downlink transmission must be used. The RI is only one value which means that the recommended rank is valid across the whole bandwidth;

Precoder matrix indication (PMI): PMI indicates the recommended precoder matrix that must be used in the downlink transmission. The recommended precoder matrix can be frequency-selective.

Channel quality indication (CQI): channel quality indication shows the highest modulation and coding that can be used for DL transmission. CQI can be frequency-selective too, which means that multiple CQI reports can be sent for different parts of the bandwidth.

An LTE network node may request both periodic and aperiodic CSI reports. In LTE release 8/9 both periodic and aperiodic reports are based on cell-specific reference signal (CRS), but in LTE release 10, the CSI report can also be based on CSI-RS which is used for transmission mode 9.

Positioning

Several positioning methods for determining the location of the terminal device 121 exist. The position of the terminal device 121, also referred to as target device in this case, may be determined by using one or more positioning measurements, which can be performed by a suitable measuring node or device. Depending upon the positioning the measuring node can either be the terminal device 121 itself, a separate radio node (i.e. a standalone node), a serving and/or neighboring node of the terminal device 121, etc.

Also, depending upon the positioning method, the measurements may be performed by one or more types of measuring nodes.

The positioning methods may comprise, but are not limited to:

Satellite based methods: In this case the measurements performed by the terminal device 121 on signals received from the navigational satellites are used for determining target device's location. For example, either GNSS or A-GNSS (e.g. A-GPS, Galileo, COMPASS, GANSS, etc.) measurements are used for determining the position of the terminal device 121;

OTDOA: This method uses a measurement in the terminal device 121 related to time difference of arrival of signals from radio nodes (e.g. terminal device RSTD measurement) for determining the position of the terminal device 121 in LTE or SFN-SFN type 2 in HSPA;

UTDOA: It uses measurements done at a measuring node (e.g. LMU) on signals transmitted by a terminal device 121. The LMU measurement is used for determining the position of the terminal device 121;

Enhanced cell ID: It uses one or more of measurements for determining the position of the terminal device 121, such as, e.g. any combination of terminal device Rx-Tx time difference, BS Rx-Tx time difference, timing advanced (TA) measured by the BS, LTE RSRP/RSRQ, HSPA CPICH measurements (CPICH RSCP/Ec/No), angle of arrival (AoA) measured by the BS on terminal device 121 transmitted signals, etc., for determining the position of the terminal device 121. The TA measurement is done using use either terminal device Rx-Tx time difference or BS Rx-Tx time difference or both;

Hybrid methods: It relies on measurements obtained using more than one positioning method for determining position of the terminal device 121;

In LTE, the positioning node (e.g. E-SMLC or location server) configures the terminal device 121, the network node 110 or LMU to perform one or more positioning measurements depending upon the positioning method. The positioning measurements are used by the terminal device 121 or by a measuring node or by the positioning node to determine the terminal device 121 location. In LTE, the positioning node communicates with terminal device 121 using LPP protocol and with the network node 110 using LPPa protocol.

Device-to-Device (D2D) Communication

D2D communication enables direct communication between devices e.g. between pair or group of terminal devices. The D2D communication may be managed by the network node 110 or can be done autonomously by the terminal devices involved in D2D communication. In the former case, the D2D terminal devices maintain a communication link also with the network node 110 for control, resource assignment, etc. The D2D communication may share the spectrum or frequency band used for cellular communication between terminal device 121 and network node 110, or may use a dedicated spectrum or band.

There are several motivations for introducing the possibility for direct D2D communication as opposed to requiring devices to communicate via an infrastructure node, such as, a cellular base station or a wireless access point.

The D2D terminal device may perform the radio measurements, such as, e.g. RSRP, RSRQ, terminal device Rx-Tx time difference, etc., like normal terminal devices on signals transmitted to and/or received from the network node 110. In addition the D2D terminal device may also perform the radio measurements on signals transmitted to and/or received from the other D2D terminal devices with which it communicates. These D2D specific measurements are also similar to SINR, SNR, BLER, RSRP, RSRQ, terminal device Rx-Tx time difference, etc.

According to one aspect, examples of some embodiments presented herein may be described as a method in an IDC capable terminal device 121, or UE, of simultaneously operating at least one cellular system and one in-device external wireless system of handling the IDC interference problem due to simultaneous operation of the at least two systems, wherein the method comprises determining implicitly, or predicting, the IDC interference without operating the in-device external wireless system, which determination is based on expected transmit power level and/or expected received signal quality, when both systems would operate, and sending an indication to the network node 110 based on the determined IDC interference problem.

According to another aspect, examples of some embodiments presented herein may be described as a method in an IDC capable terminal device 121 of simultaneously operating at least one cellular system and one in-device external wireless system of handling the IDC interference due to simultaneous operation of the at least two systems, wherein the method further comprises selecting between a first method of determining implicitly the IDC interference without operating the in-device external wireless system and a second method of determining explicitly the IDC interference by operating the in-device external wireless system, wherein the selection between methods is based on one or more of explicit indication from the network node 110, signal quality and radio performance (e.g. user throughput), determining the IDC interference based on the said selected first or second method, and sending an indication to the network node 110 based on the determined IDC interference problem.

According to a further aspect, examples of some embodiments presented herein may be described as a method in a network node 110 serving an IDC capable terminal device 121, wherein the method comprises, configuring the terminal device 121 for using one of: a first method of determining implicitly the IDC interference without operating the in-device external wireless system, a second method of determining explicitly the IDC interference by operating the in-device external wireless system and any of the first and second methods for determining the IDC interference, and receiving from the terminal device 121 an indication related to the detected IDC interference problem determined based on the configured method.

According to yet a further aspect, examples of some embodiments presented herein may be described as a method in an IDC capable terminal device 121, wherein the method further comprises sending another indication informing the network node 110 whether the indicated IDC interference problem is based on implicit determination or explicit determination of the interference.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

ABBREVIATIONS

ACK Acknowledgement
A-GNSS Assisted GNSS
A-GPS Assisted GPS
AM Acknowledged Mode
AoA Angle of Arrival
ARQ Automatic Repeat reQuest
BLER Block Error Rate
BS Base Station
CA Carrier Aggregation
CDMA Code Division Multiple Access
CID Cell Identity
CGI Cell Global Identity
CPICH Common Pilot CHannel
CQI Channel Quality Indication
CRS Cell-specific Reference Signal
CSG Closed Subscriber Group
CSI Channel State Information
D2D Device to Device
DCCH Dedicated Control CHannel
DL Downlink
DRX Discontinuous Reception
ECGI E-UTRAN Cell Global Identifier
eNB evolved eNodeB
E-SM LC Evolved Serving Mobile Location Centre
E-UTRA Evolved Universal Terrestrial Radio Access
E-UTRAN Evolved Universal Terrestrial Radio Access Network
FDD Frequency Division Duplex
FDM Frequency Division Multiplexing
GANSS Assisted Galileo and Additional Navigation Satellite Systems
GERAN GSM/EDGE Radio Access Network
GNSS Global Navigation Satellite System
GPS Global Positioning System
GSM Global System for Mobile communications
HARQ Hybrid ARQ
HSPA High-Speed Packet Access
HRPD High Rate Packet Data
ID Identity
IDC In-Device Coexistence
ISM Industrial, Scientific and Medical
L1 Layer 1
L2 Layer 2
LMU Location Measurement Unit
LPP LTE Positioning Protocol
LPPa LTE Positioning Protocol A
LTE Long Term Evolution
M2M Machine to Machine
MAC Medium Access Control
MDT Minimization of drive test
MIB Master Information Block
MME Mobility Management Entity
NACK Negative Acknowledgment
O&M Operational and Maintenance
OFDM Orthogonal Frequency Division Multiplexing
OOS Out Of Synchronization
OSS Operational Support Systems
OTDOA Observed Time Difference of Arrival
PBCH Physical Broadcast Channel
PCC Policy Control and Charging
PCFICH Physical Control format Indicator
Pcell Primary Cell
PCI Physical Cell Identity
PDCCH Physical Downlink Control Channel
PDSCH Physical Downlink Shared Channel PHICH Physical Hybrid ARQ Indicator Channel
PMI Precoder Matrix Indication
PSS Primary Synchronization Signal
QoS Quality of Service
RAT Radio Access Technology
RE Resource Element
RB Resource Block
RLC Radio Link Control
RLF Radio Link Failure
RLM Radio Link Monitoring
RNC Radio Network Controller
RI Rank Indication
RIP Received Interference Power
RRC Radio Resource Control
RRM Radio Resource Management
RSCP Received Signal Code Power
RSRQ Reference signal received quality
RSRP Reference signal received power
RSSI Received Signal Strength Indicator
RSTD Reference signal time difference
RTT Round-Trip Time
RX Reception
SAP Service Access Point
SFN Single Frequency Network
SI System Information
SIB System Information Block
SINR Signal to Interference plus Noise Ratio
SNR Signal to Noise Ratio
SON Self Organizing Network
SRS Sounding Reference Signal
SSS Secondary Synchronization Signal
TA Timing Advance
TDD Time Division Duplex
TDM Time Division Multiplexing
TX Transmission
UE User Equipment
UL Uplink
UTDOA Uplink Time Difference of Arrival
UTRAN Universal Terrestrial Radio Access Network
WLAN Wireless Local Area Network

The invention claimed is:

1. A method, in a terminal device, for In-Device Coexistence, IDC, interference handling, the terminal device being configured to be in a communications network, the method comprising:
proactively detecting an IDC interference between an in-device external wireless system and a cellular system, wherein said proactive detection occurs prior to a start of said IDC interference;
determining whether a frequency separation between the cellular system and the in-device external wireless system is below a threshold;
when the frequency separation between the cellular system and the in-device external wireless system is below the threshold, sending, to a network node, an indication of IDC interference based on the proactively detecting; and
when the frequency separation between the cellular system and the in-device external wireless system is not below the threshold, switching to a reactive mode of detection.

2. The method according to claim 1, wherein the proactively detecting further comprises determining a time to start said proactive detection.

3. The method according to claim 2, wherein the determining is based on any one or more of a time threshold, detected radio characteristics with respect to a signal threshold, or a type of application or service that is in use.

4. The method according to claim 1, wherein the determining is based on any one or more of an activity level of the external wireless system, collected statistics or historical performance data of the terminal device, or a type of application program or service.

5. The method according to claim 1, wherein the proactively detecting further comprises determining a level of an expected IDC interference.

6. The method according to claim 5, wherein the determining is based on at least one or more of a type of in-device external wireless system or cellular system to be used, a frequency band of operation of said in-device external wireless system or cellular system, an expected power transmission of said in-device external wireless system, measured or received signal quality metrics related to the cellular system, a transmit signal level or a signal characteristics related to the cellular system, or a target quality of service of an upcoming service or communication.

7. The method according to claim 1, wherein switching to the reactive mode of detection occurs when the IDC interference is already present.

8. The method according to claim 1, wherein the sending occurs during a presence of the IDC interference and the sending further comprises delaying the sending until a level of the IDC interference is below a threshold.

9. The method according to claim 1, wherein the sending occurs during a presence of the IDC interference and the sending further comprises turning off or reducing a transmission power level of the in-device external wireless system during the sending.

10. A terminal device, for In-Device Coexistence, IDC, interference handling, the terminal device being configured to be in a communications network, the terminal device comprising:
processing circuitry configured to:
proactively detect an IDC interference between an in-device external wireless system and a cellular system, wherein said proactive detection occurs prior to a start of said IDC interference;
determine whether a frequency separation between the cellular system and the in-device external wireless system is below a threshold;
radio circuitry configured to:
when the frequency separation between the cellular system and the in-device external wireless system is below the threshold, send, to a network node, an indication of IDC interference based on the proactive detection;
the processing circuitry further configured to:
when the frequency separation between the cellular system and the in-device external wireless system is not below the threshold, switch to a reactive mode of detection.

11. The terminal device according to claim 10, wherein the processing circuitry is further configured to determine the time to start the proactive detection based on any one or more of a time threshold, detected radio characteristics with respect to a signal threshold, or a type of application or service that is in use.

12. The terminal device according to claim 10, wherein the processing circuitry is further configured to determine an expected start of the in-device external wireless system.

13. The terminal device according to claim 12, wherein the processing circuitry is further configured to determine the expected start of the in-device external wireless system based on any one or more of an activity level of the external wireless system, collected statistics or historical performance data of the terminal device, or a type of application program or service.

14. The terminal device according to claim 10, wherein the processing circuitry is further configured to determine a level of an expected IDC interference.

15. The terminal device according to claim 14, wherein the processing circuitry is further configured to determine the level of the expected IDC interference based on at least one or more of a type of in-device external wireless system or cellular system to be used, a frequency band of operation of said in-device external wireless system or cellular system, an expected power transmission of said in-device external wireless system, measured or received signal quality metrics related to the cellular system, a transmit signal level or a signal characteristics related to the cellular system, or a target quality of service of an upcoming service or communication.

16. The terminal device according to claim 10, wherein the processing circuitry switches to the reactive mode of detection when the IDC interference is already present.

17. The terminal device according to claim 10, wherein the radio circuitry is further configured to send the indication during a presence of the IDC interference.

18. The terminal device according to claim 17, wherein the radio circuitry is further configured to delay the sending of the indication until a level of the IDC interference is below a threshold.

19. The terminal device according to claim 17, wherein the radio circuitry is further configured to turn off or reduce a transmission power level of the in-device external wireless system during the sending of the indication.

20. A method, in a network node, for In-Device Coexistence, IDC, interference handling, the network node being configured to be in a communications network, the method comprising:
   sending, to a terminal device, configuration instructions for a detection of an IDC interference, wherein the configuration instructions further comprise switching instructions for switching to and from a proactive and reactive mode of detection based on a frequency separation between a cellular system and an in-device external wireless system;
   receiving, from the terminal device, an indication of an IDC interference between the in-device external wireless system and the cellular system, said indication further comprises
   information on whether the proactive or reactive mode of detection was utilized, wherein:
      said proactive mode of operation occurs prior to a presence of the IDC interference; and
      said reactive mode of operation occurs during a presence of said IDC interference.

21. A network node for In-Device Coexistence, IDC, interference handling, the network node being configured to be in a communications network, the network node comprising:
   radio circuitry configured to:
   send, to a terminal device, configuration instructions for a detection of an IDC interference, wherein the configuration instructions further comprise switching instructions for switching to and from a proactive and reactive mode of detection based on a frequency separation between a cellular system and an in-device external wireless system;
   receive, from the terminal device, an indication of an IDC interference between the in-device external wireless system and the cellular system, said indication further comprises information on whether the proactive or reactive mode of detection was utilized, wherein:
      said proactive mode of operation occurs prior to a presence of the IDC interference; and
      said reactive mode of operation occurs during a presence of said IDC interference.

* * * * *